United States Patent
Kim et al.

(10) Patent No.: US 9,293,112 B2
(45) Date of Patent: Mar. 22, 2016

(54) MOBILE TERMINAL AND CONTROL METHOD THEREOF

(71) Applicant: LG Electronics Inc., Seoul (KR)

(72) Inventors: Miyoung Kim, Seoul (KR); Hojae Jung, Seoul (KR); Jinwoo Park, Seoul (KR); Jongsup Kim, Seoul (KR); Yeseul Jang, Seoul (KR); Shinjun Park, Seoul (KR); Wook Shin, Seoul (KR); Jiyoung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/094,433

(22) Filed: Dec. 2, 2013

(65) Prior Publication Data
US 2014/0204040 A1   Jul. 24, 2014

(30) Foreign Application Priority Data

Jan. 21, 2013   (KR) .................. 10-2013-0006710

(51) Int. Cl.
| | |
|---|---|
| G06F 3/041 | (2006.01) |
| G09G 5/00 | (2006.01) |
| G06F 1/16 | (2006.01) |
| G06F 3/01 | (2006.01) |
| G06F 3/0481 | (2013.01) |
| G06F 3/0483 | (2013.01) |
| G06F 3/0486 | (2013.01) |
| G06F 3/0488 | (2013.01) |
| G06F 9/44 | (2006.01) |

(52) U.S. Cl.
CPC ............. *G09G 5/006* (2013.01); *G06F 1/1694* (2013.01); *G06F 3/016* (2013.01); *G06F 3/0481* (2013.01); *G06F 3/0483* (2013.01); *G06F 3/0486* (2013.01); *G06F 3/04883* (2013.01); *G06F 9/4443* (2013.01)

(58) Field of Classification Search
None
See application file for complete search history.

(56) References Cited

U.S. PATENT DOCUMENTS

| | | | |
|---|---|---|---|
| 2011/0252378 A1* | 10/2011 | Anzures et al. | ............... 715/835 |
| 2012/0236037 A1 | 9/2012 | Lessing et al. | |
| 2013/0195941 A1* | 8/2013 | Shibuya et al. | ............... 424/401 |

FOREIGN PATENT DOCUMENTS

| | | |
|---|---|---|
| CN | 102023795 | 4/2011 |
| CN | 102169411 | 8/2011 |
| CN | 102646010 | 8/2012 |

OTHER PUBLICATIONS

The State Intellectual Property Office of the People's Republic of China Application Serial No. 201310645976.X, Office Action dated Jun. 11, 2015, 10 pages.

* cited by examiner

*Primary Examiner* — Joseph Haley
(74) *Attorney, Agent, or Firm* — Lee, Hong, Degerman, Kang & Waimey

(57) ABSTRACT

A mobile terminal and a control method are provided. The mobile terminal includes: a display unit configured to output first screen information corresponding to a first application; and a controller configured to switch the first screen information to second screen information different from the first screen information output to the display unit in response to a first control command, and output a first graphic object representing the first application to at least a region of the display unit, wherein the controller outputs the first screen information corresponding to the first application again to the display unit in response to a second control command.

17 Claims, 25 Drawing Sheets

FIG. 4C
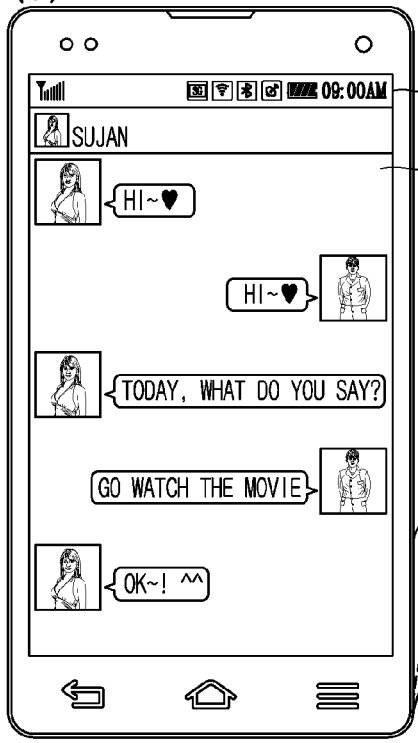
(a)
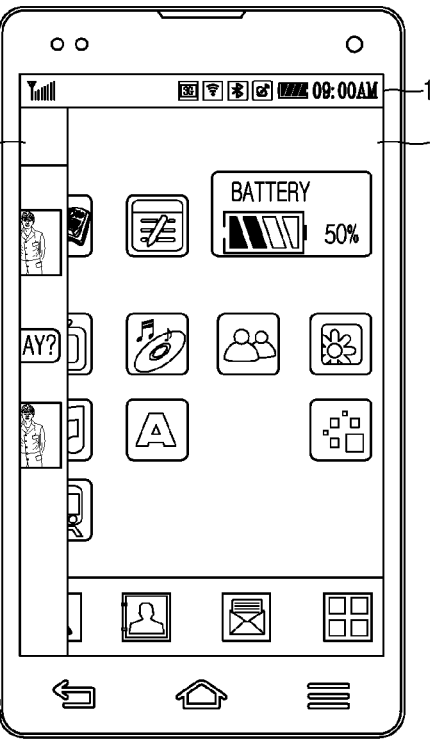
(b)
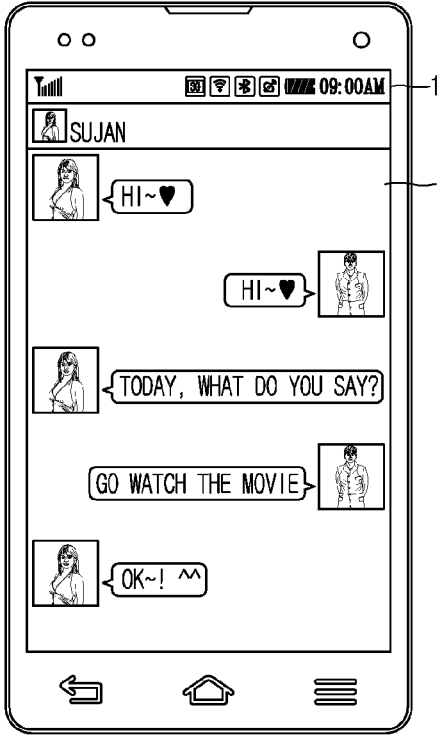
(c)

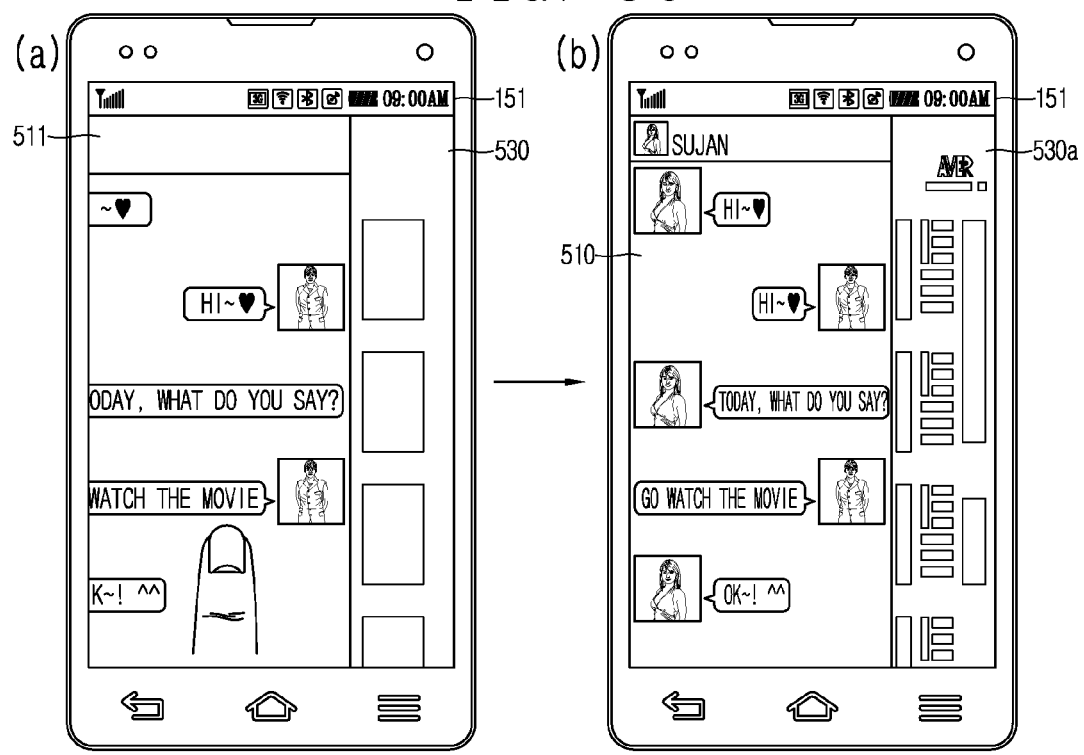

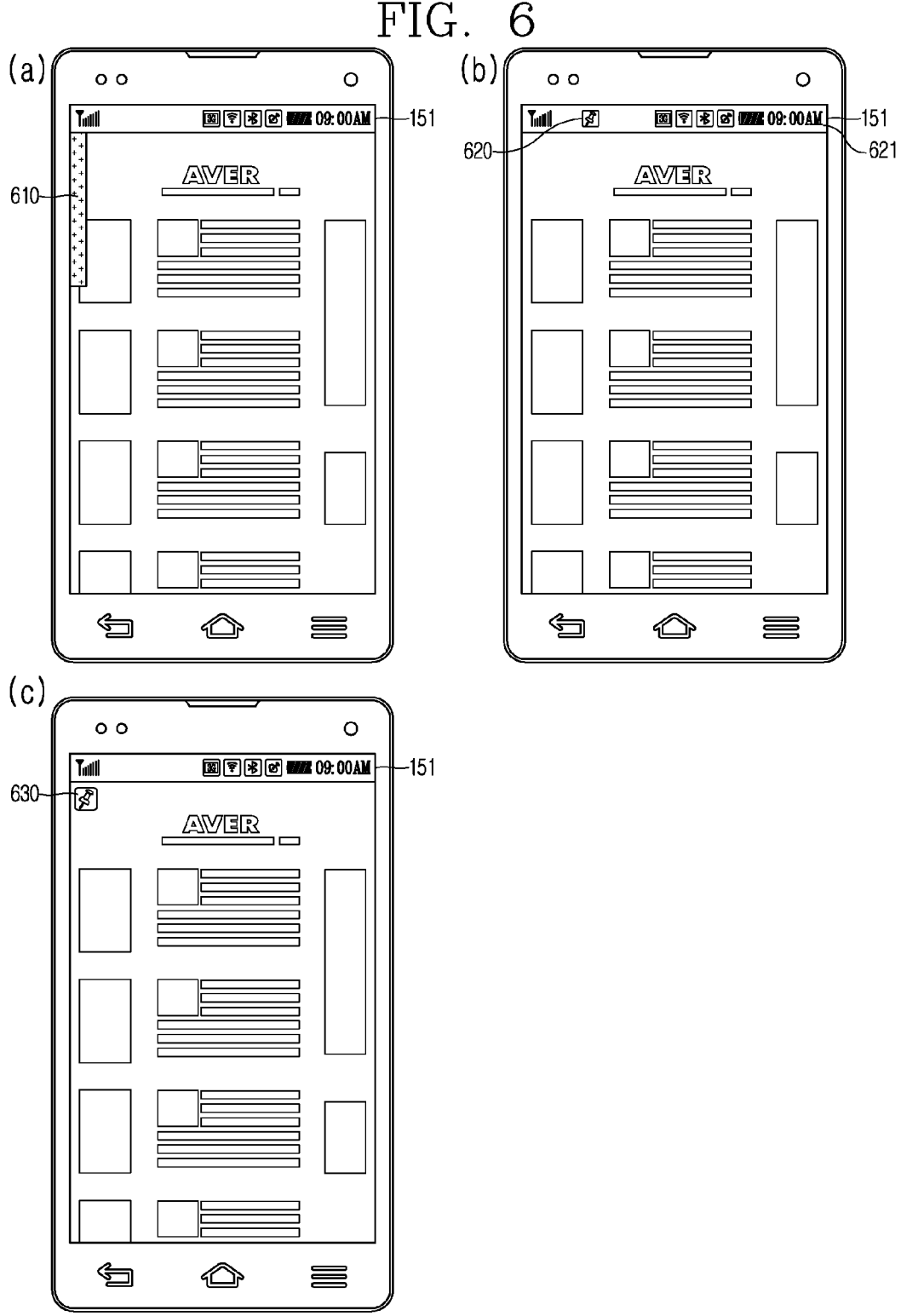

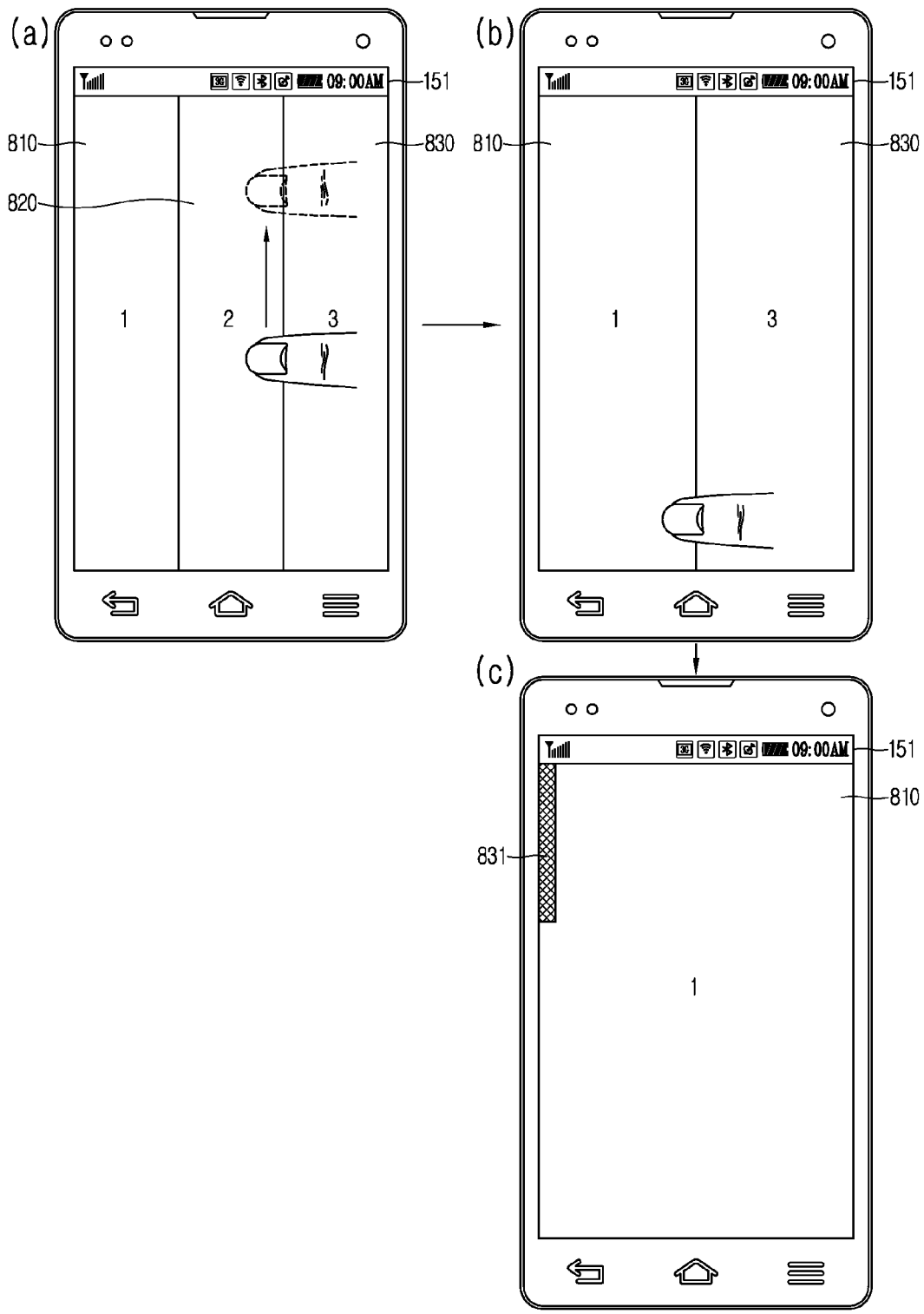

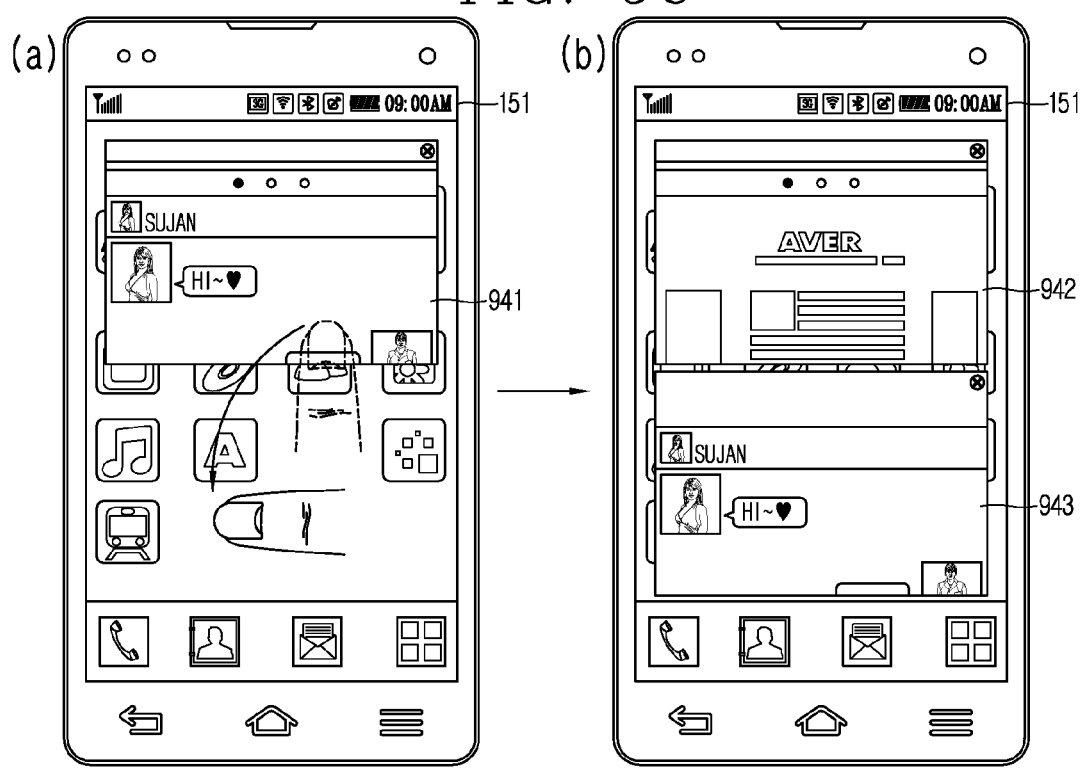

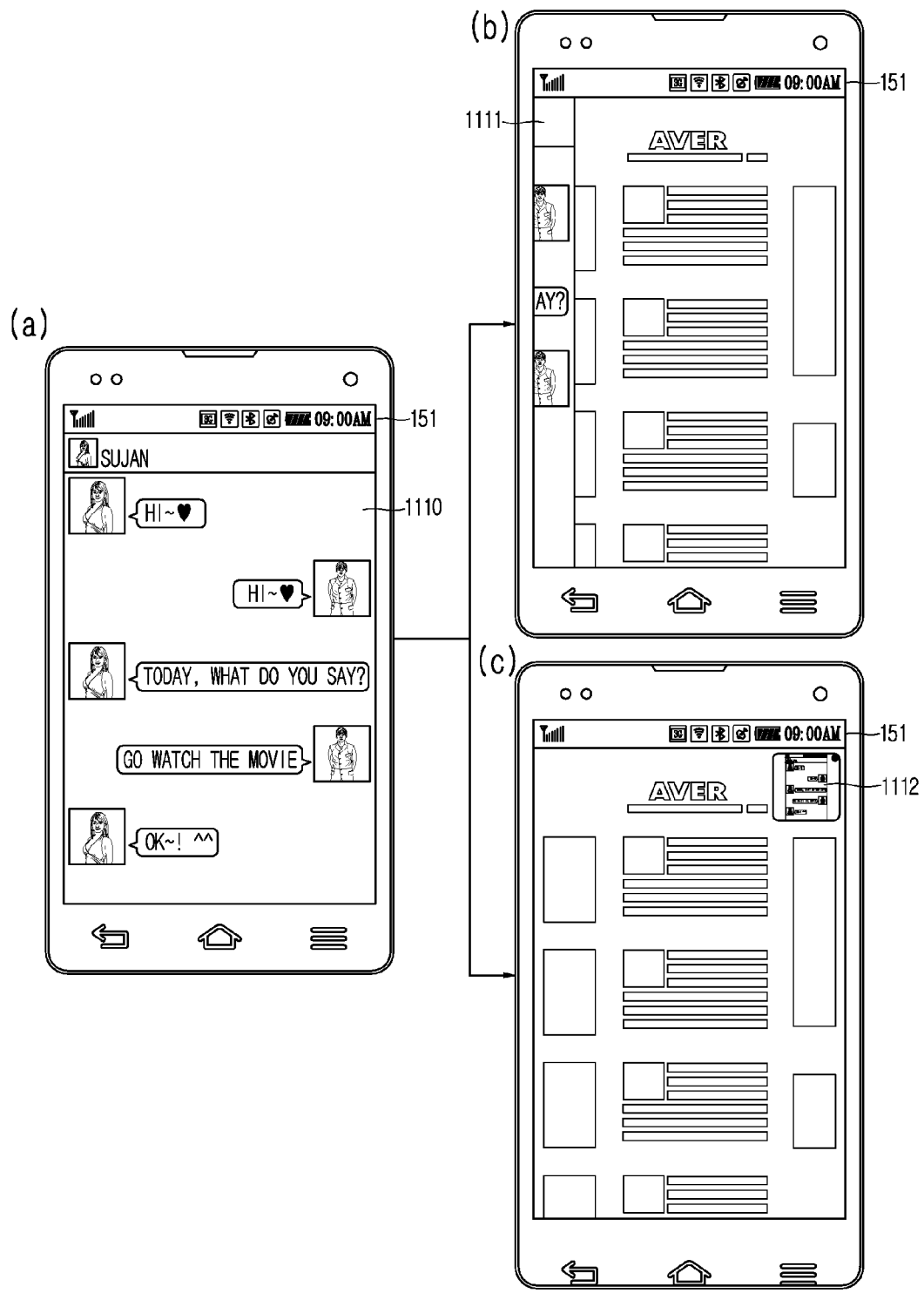

MOBILE TERMINAL AND CONTROL METHOD THEREOF

CROSS REFERENCE TO RELATED APPLICATIONS

Pursuant to 35 U.S.C. §119(a), this application claims the benefit of earlier filing date and right of priority to Korean Application No. 10-2013-0006710, filed on Jan. 21, 2013, the contents of which is incorporated by reference herein in its entirety.

BACKGROUND OF THE INVENTION

1. Field of the Invention

The present invention relates to a mobile terminal capable of executing an application and a control method thereof.

2. Description of the Related Art

In general, terminals may be divided into a mobile terminal and stationary terminal according to whether or not terminals are movable. In addition, mobile terminals may be divided into a handheld terminal and a vehicle mount terminal according to whether or not users can directly carry it around.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device. Efforts are ongoing to support and increase the functionality of mobile terminals. Such efforts include software and hardware improvements, as well as changes and improvements in the structural components which form the mobile terminal.

Also, such a mobile terminal may install various applications and execute at least one of them as necessary.

SUMMARY OF THE INVENTION

An aspect of the present invention is to provide a mobile terminal capable of quickly accessing a frequently used application, and a control method thereof.

According to an embodiment of the present invention, there is provided a mobile terminal including: a display unit configured to output first screen information corresponding to a first application; and a controller configured to switch the first screen information to second screen information different from the first screen information output to the display unit in response to a first control command, and output a first graphic object representing the first application to at least a region of the display unit, wherein the controller outputs the first screen information corresponding to the first application again to the display unit in response to a second control command.

In an embodiment of the present invention, the first control command may correspond to a drag and touch input, starting from at least two touch spots of the display unit, applied in a pre-set one direction in a state in which the first screen information is output to the display unit, and the second control command may correspond to a touch input according to a pre-set scheme applied to the first graphic object.

In an embodiment of the present invention, the second screen information may be screen information regarding a second application executed most recently before the first application is executed, or may be an idle screen.

In an embodiment of the present invention, whether the second screen information is screen information regarding the second application or an idle screen may differ according to a direction in which the drag and touch input corresponding to the first control command is applied.

In an embodiment of the present invention, the second screen information may be screen information corresponding to the second application different from the first application, and in a state in which the second screen information is displayed on the display unit, when the first control command is applied, the controller may switch the second screen information output to the display unit to third screen information different from the second screen information and output a second graphic object representing the second application such that it is in the proximity of the first graphic object, in response.

In an embodiment of the present invention, the first and second graphic objects may be sequentially displayed on the basis of a region of the display unit, and the display order of the first and second graphic objects may be based on a point in time at which the first control command with respect to the first and second applications is received.

In an embodiment of the present invention, when a touch input corresponding to the second control command is applied to the region in which the first and second graphic objects are displayed, at least portions of the first and second screen information corresponding to the first and second applications may be displayed together on the display unit.

In an embodiment of the present invention, in the case in which the at least portions of the first and second screen information are displayed together, the first and second graphic objects may disappear from the display unit.

In an embodiment of the present invention, when a drag and touch input is applied to any one of the first and second screen information, the controller may output the any one screen information to which the drag and touch input has been applied, to the display unit entirely, and output a graphic object corresponding to the other screen information again to a region of the display unit.

In an embodiment of the present invention, order in which the first and second screen information are displayed on the basis of a region of the display unit may correspond to order in which the first and second graphic objects are displayed, and in response to a touch input according to a pre-set scheme applied to any one of the first and second screen information, the controller may change order in which the first and second screen information are displayed.

In an embodiment of the present invention, the display order of the first and second graphic objects may be changed dependently according to a change in the display order of the first and second screen information.

In an embodiment of the present invention, when a drag and touch input is applied to any one of the first and second screen information in a pre-set one direction, the controller may control the display unit not to output any one screen information any longer.

In an embodiment of the present invention, when an event occurs with respect to at least one of the first and second applications, the controller may visually highlight at least one graphic object corresponding to the event-generated application among the first and second graphic objects.

In an embodiment of the present invention, the first graphic object may have visual information corresponding to at least a portion of the first screen information.

In an embodiment of the present invention, the controller may gradually output the first screen information to the display unit on the basis of a degree at which the first graphic object is dragged, and the second screen information output to the display unit may overlap with the first screen information.

According to another embodiment of the present invention, there is provided a control method of a mobile terminal, including: outputting first screen information corresponding to a first application to a display unit; switching the first screen information output to the display unit to second screen information different from the first screen information in response to a first touch input, and outputting a first graphic object representing the first application to at least a region of the display unit; and outputting again the first screen information to the display unit in response to a second touch input applied to the first graphic object.

In an embodiment of the present invention, an attribute of the first screen information output to the display unit in response to the second touch input may differ according to a direction in which the first touch input is applied.

In an embodiment of the present invention, the attribute of the first screen information may be an execution screen of the first application or a captured image of the first screen information which was output to the display unit when the first touch input was applied.

In an embodiment of the present invention, when the second touch input is applied, the second screen information on the display unit may be switched to the first screen information, and when a third touch input different from the second touch input is applied to the display unit, the first screen information may be output such that it overlaps with the second screen information.

In an embodiment of the present invention, a position in which the first screen information is displayed may be changed on the basis of a touch input applied to the region in which the first screen information is displayed.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 4A, 4B, and 4C are conceptual views illustrating the control method of FIG. 3.

FIGS. 5A, 5B, 5C, and 5D are conceptual views illustrating a method for outputting screen information in response to a touch command with respect to a graphic object in the mobile terminal according to an embodiment of the present invention.

FIG. 6 is a conceptual view illustrating a method for displaying a graphic object in the mobile terminal according to an embodiment of the present invention.

FIGS. 8A, 8B, 8C, 9A, 9B, 9C, and 9D are conceptual views illustrating a method for displaying screen information corresponding to a plurality of graphic objects, respectively, in the mobile terminal according to an embodiment of the present invention.

FIGS. 11A and 11B are conceptual views illustrating a method for utilizing screen information output to the display unit in the mobile terminal according to an embodiment of the present invention.

DETAILED DESCRIPTION OF THE INVENTION

The embodiments of the present invention will now be described with reference to the accompanying drawings, in which like numbers refer to like elements throughout although the embodiments are different, and a description of the like elements a first embodiment will be used for those of the different embodiment. In the following description, usage of suffixes such as 'module', 'part' or 'unit' used for referring to elements is given merely to facilitate explanation of the present invention, without having any significant meaning by itself. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Mobile terminals described in the present disclosure may include mobile phones, smart phones, notebook computers, tablet computers, digital broadcast receivers, PDAs (Personal Digital Assistants), PMPs (Portable Multimedia Player), navigation devices, slate PCs, tablet PCs, ultra-books, and the like. However, it would be understood by a person skilled in the art that the configuration according to embodiments of the present invention can be also applicable to the fixed types of terminals such as digital TVs, desk top computers, and the like, except for any elements especially configured for a mobile purpose.

Figure 1:
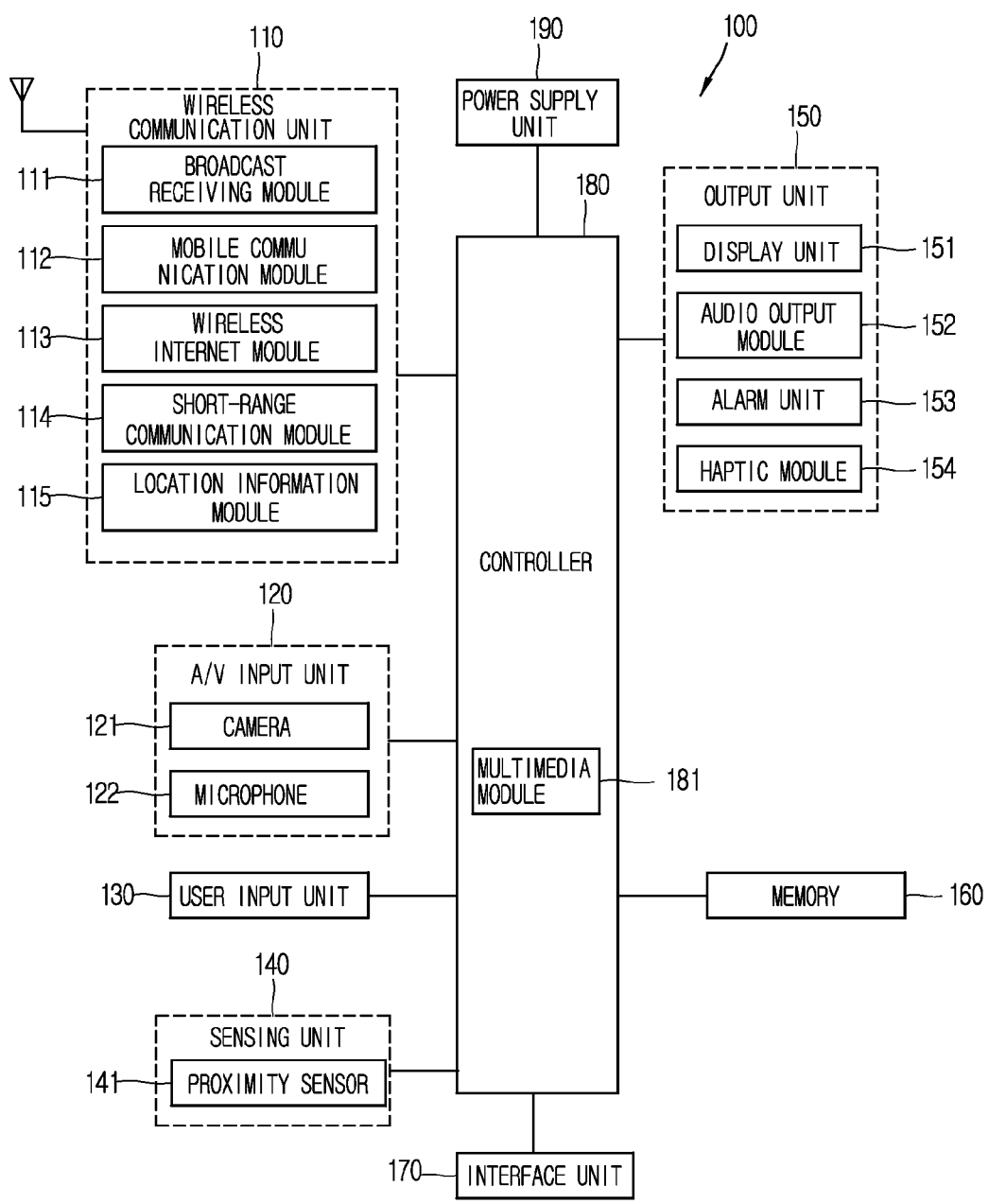
FIG. 1 is a block diagram of a mobile terminal according to an embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more modules allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

With reference to FIG. 1, the A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad, a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, when a state of the mobile terminal satisfies pre-set conditions, the controller 180 may execute a locked state for limiting an input of a control command of the user with respect to applications. Also, in a locked state, the controller may control a locked screen displayed on the locked state based on a touch input sensed through the display unit.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

The mobile terminal according to an embodiment of the present invention described above with reference to FIG. 1, the mobile terminal in which components of the mobile terminal are disposed, or the structure of the mobile terminal will be described.

Figure 2A:
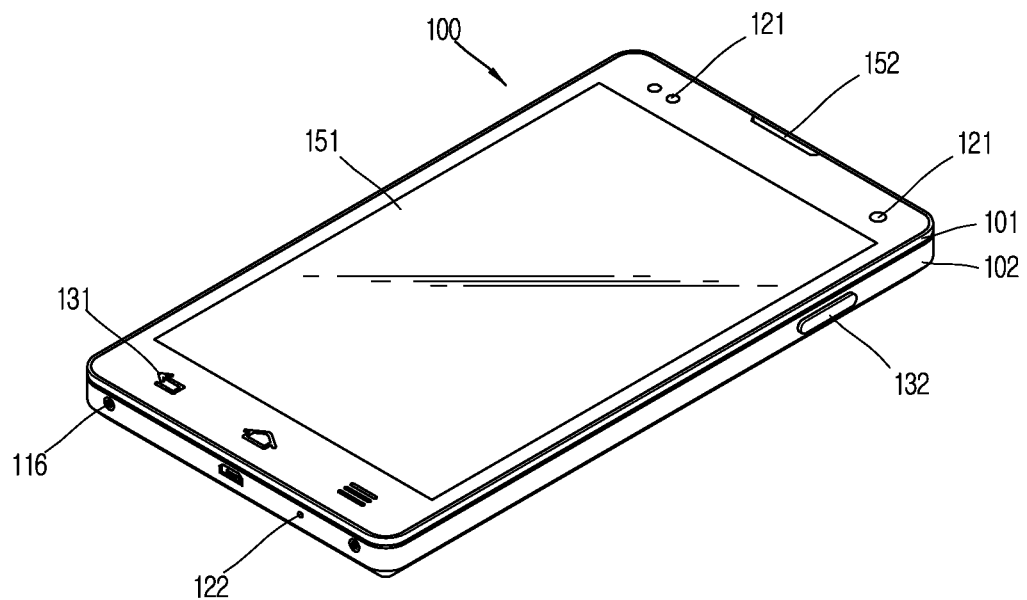
FIGS. 2A and 2B are front perspective views illustrating an example of a mobile terminal according to an embodiment of the present invention.
Figure 2B:
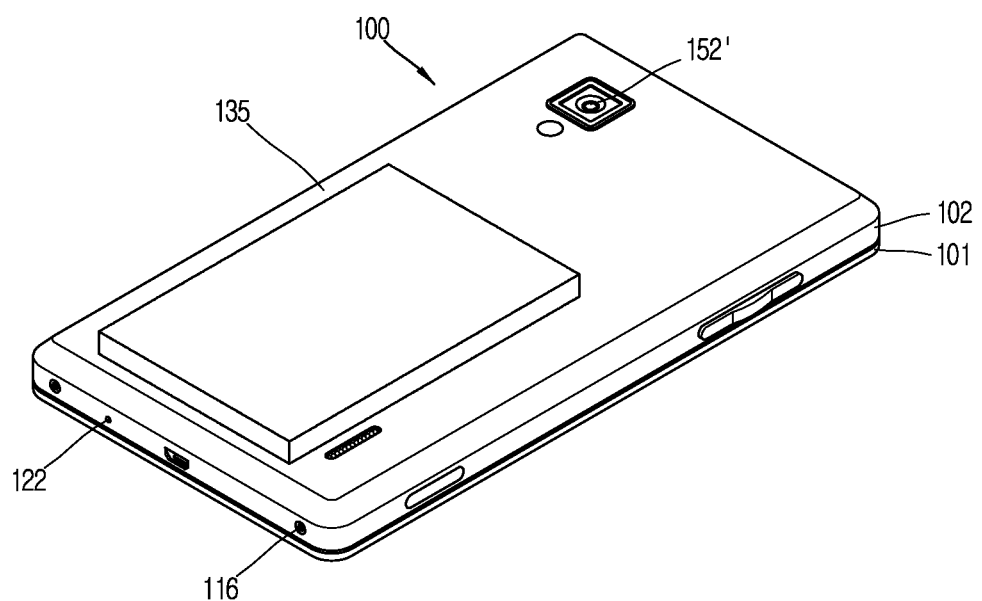

FIG. 2A is a front perspective view of the mobile terminal according to an embodiment of the present invention, and FIG. 2B is a rear perspective view of the mobile terminal illustrated in FIG. 2A.

The disclosed mobile terminal has a bar type terminal body. However, the present invention is not limited thereto and may be applicable to various structures such as a slide type mobile terminal, a folder type mobile terminal, a swing type mobile terminal, a swivel type mobile terminal, etc, in which two or more bodies are combined to be relatively movable.

As illustrated, the terminal body 100 (referred to as 'body', hereinafter) includes a front surface, a lateral surface, and a rear surface. Also, the body includes both ends formed in a length direction.

The body includes a case (or casing, housing, cover, etc.) constituting the external appearance. In this embodiment, the case may include a front case 101 and a rear case 102. Various electronic components are installed in the space between the front case 101 and the rear case 102. One or more intermediate cases may be additionally disposed between the front case 101 and the rear case 102.

The cases may be formed by injection-molding a synthetic resin or may be made of a metallic material such as stainless steel (STS) or titanium (Ti), etc.

The display unit 151, the audio output module 152, the camera 121, the user input unit 130/131, 132, the microphone 122, the interface unit 170, etc. may be disposed mainly on the front case 101 of the terminal body 100.

The display unit 151 occupies the most of a main surface of the front case 101. The audio output unit 151 and the camera 121 are disposed at a region adjacent to one end portion among both end portions of the display unit 151, and the user input unit 131 and the microphone 122 are disposed at a region adjacent to another end portion. The user input unit 132 and the interface unit 170 may be disposed at the sides of the front case 101 and the rear case 102. The microphone 122 may be disposed on the other end of the body 100.

The user input unit 130 is manipulated to receive a command for controlling the operation of the mobile terminal 100 and may include a plurality of manipulation units 131 and 132. The manipulation units 131 and 132 may be generally referred to as a manipulating portion, and various methods and techniques can be employed for the manipulation portion so long as they can be operated by the user in a tactile manner.

Content inputted by the first and second manipulation units 131 and 132 can be variably set. For example, the first manipulation unit 131 may receive a command such as starting, ending, scrolling, etc., and the second manipulation unit 132 may receive a command such as controlling of the size of a sound outputted from the audio output unit 152 or conversion into a touch recognition mode of the display unit 151.

With reference to FIG. 2B, an audio output unit 152' may be additionally disposed on the rear surface of the terminal body. The audio output module 152' may implement stereophonic sound functions in conjunction with the audio output module 152 (See FIG. 2A) and may be also used for implementing a speaker phone mode for call communication.

The power supply unit 190 for supplying power to the mobile terminal 100 is mounted on the terminal body. The power supply unit 190 may be installed within the terminal body or may be directly attached to or detached from the exterior of the terminal body.

A touch pad 135 for detecting a touch may be additionally mounted on the rear case 102. The touch pad 135 may be configured to be light transmissive like the display unit 151. In this case, when the display unit 151 is configured to output visual information from both sides thereof, the visual information may be recognized also via the touch pad 135. Alternatively, a display may be additionally mounted on the touch pad so that a touch screen may be disposed on the rear case 102.

A camera 121' may additionally be disposed on the rear case 102 of the terminal body. The camera 121' may have an image capture direction which is substantially opposite to that of the camera 121 (See FIG. 2*a*), and have a different number of pixels than the camera 121.

For example, the camera 121 may have a smaller number of pixels to capture an image of the user's face and transmit such image to another party, and the camera 121' may have a larger number of pixels to capture an image of a general object and not immediately transmit it in most cases. The cameras 121 and 121' may be installed on the terminal body such that they can be rotatable or popped up.

A flash 123 and a mirror 124 may be additionally disposed adjacent to the camera 121'. When an image of a subject is captured with the camera 121', the flash 123 illuminates the subject. The mirror 124 allows the user to see himself when he wants to capture his own image (i.e., self-image capturing) by using the camera 121'.

An audio output unit 252' may be additionally disposed on the rear surface of the terminal body. The audio output unit 252' may implement a stereoscopic function along with the audio output module 22 (See FIG. 2A), and may be used for implementing a speaker phone mode during call communication.

A power supply unit 190 for supplying power to the mobile terminal 100 may be installed on the terminal body. The power supply unit 190 may be installed in the terminal body or may be directly detached from the outside of the terminal body.

A touch pad 135 for detecting a touch may be additionally mounted on the rear case 102. Such a touch pad 135 may be configured to be light-transmissive like the display unit 151. In this case, when the display unit 151 is configured to output visual information from both surfaces thereof, the visual information may be recognized also through the touch pad 135. The information output to the both surfaces of the display unit 151 may be controlled by the touch pad 135. Also, a display unit may be additionally mounted on the touch pad 135, so a touch screen may be displayed on the rear case 102.

The touch pad 135 is operated in association with the display unit 151 of the front case 101. The touch pad 135 may be disposed to be parallel on the rear side of the display unit 151. The touch pad 135 may have the same size as the display unit 151 or smaller.

Also, the mobile terminal according to an embodiment of the present invention that may include one or more of the components as described above may provide a user environment in which a user may easily and quickly access a frequently used application. Namely, in the mobile terminal and the control method thereof according to an embodiment of the present invention, when a control command according to a pre-set scheme is applied in a state in which screen information regarding an application is output, although different screen information, not the screen executing the application (or an execution screen of the application), is displayed on the display unit, a graphic object for immediately outputting the screen information regarding the application may be output to a region of the display unit. Thus, when a control command according to a pre-set scheme is applied to the graphic object, screen information regarding the application may be output again to the display unit. Thus, the user may quickly enter a particular application by using the graphic object any time while he is using the mobile terminal.

Figure 3:
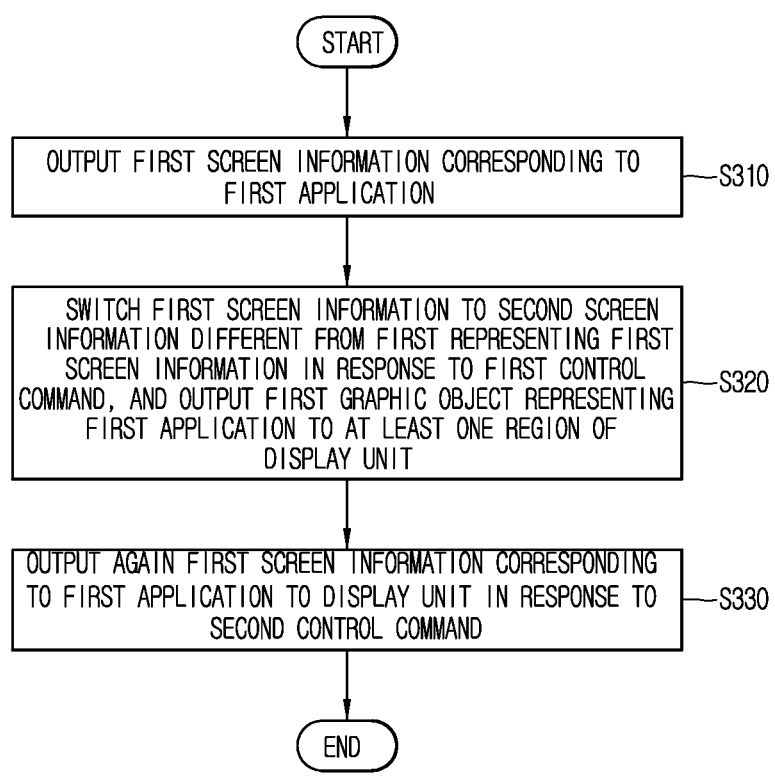
FIG. 3 is a flow chart illustrating a control method of the mobile terminal according to an embodiment of the present invention.
Figure 4A:
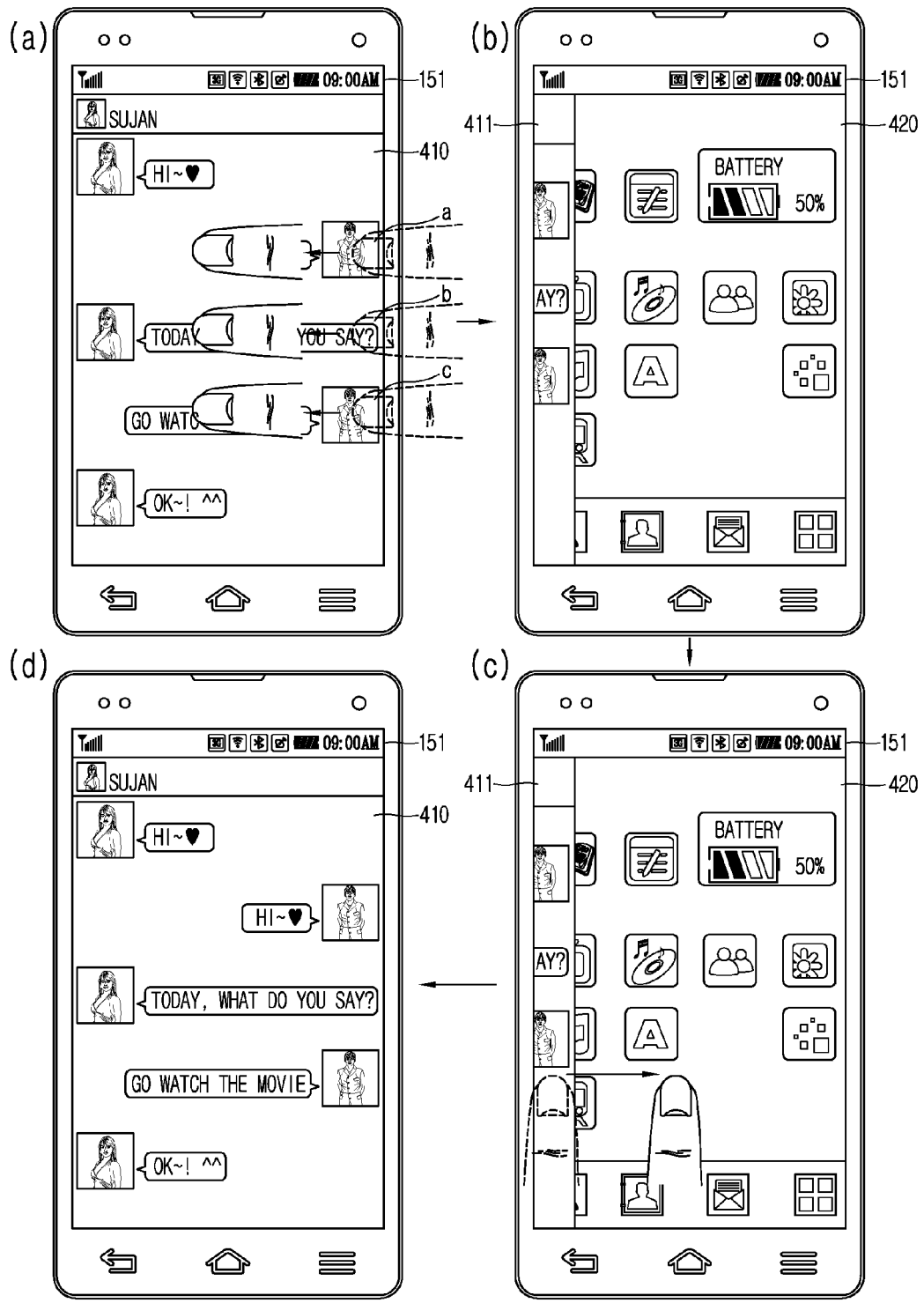
Figure 4B:
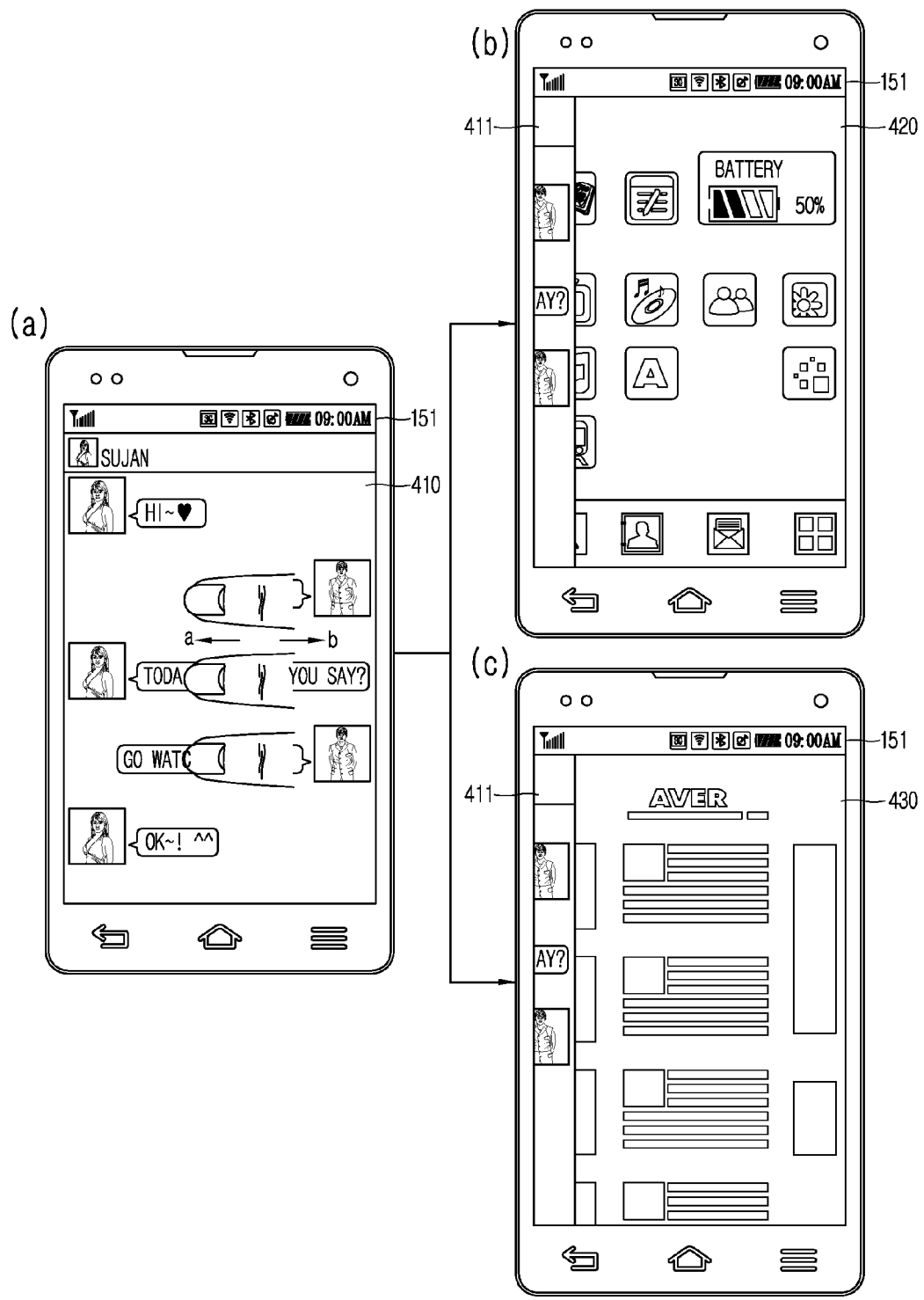

Hereinafter, a method for controlling the mobile terminal to quickly enter an application will be described in detail with reference to the accompanying drawings. FIG. 3 is a flow chart illustrating a control method of the mobile terminal according to an embodiment of the present invention. FIGS. 4A, 4B, and 4C are conceptual views illustrating the control method of FIG. 3.

In the mobile terminal according to an embodiment of the present invention, first screen information corresponding to a first application may be output to the display unit 151 (S310). Here, the first application refers to a certain application among a plurality of applications installed in the mobile terminal, and the first application may be an application selectively executed by the user.

Also, the first screen information may refer to an execution screen of the first application. Namely, screen information displayed on the display unit 151 after the first application is executed may be referred to as the first screen information.

For example, as illustrated in FIG. (a) in FIG. 4A, when a message function application is executed, screen information 410 corresponding to the message function application may be output to the display unit 151.

In the state in which the first screen information corresponding to the first application is output, when a first control command is received, the controller 180 may switch the first screen information to second screen information different from the first screen information and output a first graphic object representing the first application to at least one region of the display unit 151 (S320).

Here, the first control command may be received when a touch input according to a pre-set scheme is applied to the display unit 151 or when external physical force that may be sensed by at least one sensor provided in the mobile terminal 100 is applied to the display unit 151. Namely, the first control command may be received through various methods.

For example, as illustrated in (a) in FIG. 4A, in a state in which the first screen information 410 is displayed on the display unit 151, the first control command may be received when drag and touch inputs, starting from at least three spots a, b, and c, are applied. When the touch inputs are applied by three fingers, the controller 180 may determine that the first control command has been received. Here, the one direction may be a predetermined direction.

In this manner, when the first control command is received, as illustrated in (b) in FIG. 4A, second screen information 420 different from the first screen information 410 of the first application is output to the display unit 151. Here, information output as the second screen information 420 may be screen information (or an executed screen) of an application different from the first application, or may be an idle screen. Here, the application different from the first application may be an application corresponding to screen information which has been output most recently before the screen information corresponding to the first application was output.

Although the second screen information 420 is displayed according to the first control command, the first application may not be terminated.

Meanwhile, as illustrated, the controller 180 may output a graphic object 411 representing the first application in a region of the display unit 151, together with the second screen information 420. As illustrated, the graphic object 411 may overlap with at least a portion of the second screen information 420. Also, although not shown, the graphic object 411 may be displayed in a region different from the region in which the second screen information 420 is displayed, such that the graphic object 411 do not overlap with the second screen information 420.

Also, a visual image of the graphic object 411 may be the same as or similar to at least a portion of the first screen information. Also, the graphic object 411 may be displayed to have a color representing the first application. Also, the visual information of the graphic object 411 may be variously changed.

When the first control command is applied, the controller 180 may switch the first screen information displayed on the display unit 151 to the second screen information and output the graphic objects in a region of the display unit 151.

When the second control command is received, the controller 180 may output again the first screen information corresponding to the first application to the display unit 151 in response to the second control command (S330).

Here, the second control command may be received when a touch input according to a pre-set scheme is applied to the display unit 151 or when external physical force that may be sensed by at least one sensor provided in the mobile terminal 100 is applied to the display unit 151. The second control command may be received when a touch input according to a pre-set scheme is applied to the graphic object 411.

For example, when a drag and touch input is applied to the graphic object 411 as illustrated in (c) of FIG. 4A, the controller 180 may output the screen information 410 regarding the first application corresponding to the graphic object 411 again.

Namely, the user may not currently use the first application, but the graphic object 411 corresponding to the first application may be output to a region of the display unit 151 through the first control command, so that the user may immediately use the first application again when he or she wants to. When the second control command is applied to the graphic object 411, the controller 180 may control the display unit 151 to output again the screen information regarding the first application. Thus, the user may quickly access the first application any time through the graphic object.

Meanwhile, the screen information regarding the first application output to the display unit 151 in response to the received second control command may be screen information regarding the first application output to the display unit at a point in time when the first control command is applied. Also, the screen information regarding the first application may be screen information output at an initial stage when the first application is executed. Also, the screen information regarding the first application may be screen information related to an event of the first application when the event occurs. In this manner, the screen information regarding the first application output to the display unit 151 may be configured according to various embodiments in response to the received second control command.

Meanwhile, when the second screen information different from the first screen information is output to the display unit in response to the first control command as described above, a type of the second screen information may vary according to a touch direction of a touch input corresponding to the first control command.

For example, as illustrated in (a) of FIG. 4B, in a state in which the first screen information 410 corresponding to the first application is output, when a touch input corresponding to the first control command is applied in an 'a' direction, the controller 180 may output the graphic object 411 and an idle screen 420 as the second screen information as illustrated in (b) of FIG. 4B. Also, in a state in which the first screen information 410 corresponding to the first application is output, when the touch input corresponding to the first control command is applied in a 'b' direction as illustrated in (a) of FIG. 4B, the controller 180 may output the graphic object 411 and screen information 430 corresponding to the second application as second screen information as illustrated in (c) of FIG. 4B. here, the second application may be an application corresponding to screen information which has been output most recently to the display unit 151 before the first screen information 410 was output.

Meanwhile, the first control command may be received through a touch input applied to the display unit 151. In another example, the first control command may be received by external physical force applied to the mobile terminal 100. For example, when a portion 440a of the body of the mobile terminal 100 is tapped on by the user by a pre-set number of times as illustrated in (a) of FIG. 4C, the second screen information 420, instead of the first screen information 410, may be output and the graphic object 411 may be output to a region of the display unit 151. When another portion 440b different from the one portion 440a of the body of the mobile terminal 100 is tapped on by the user by a pre-set number of times as illustrated in (b) of FIG. 4C, the controller 180 may output the first screen information 410 again to the display unit 151 as illustrated in (c) of FIG. 4C.

Also, although not illustrated, the first control command may be received when the body of the mobile terminal 100 is tilted in a pre-set direction.

Namely, in addition to the touch inputs applied to the display unit 151, the controller 180 may receive at least one of the first and second control commands by using various sensors provided in the body of the mobile terminal 100.

As described above, in the mobile terminal and the control method thereof according to embodiments of the present invention, a user environment allowing the user to immediately use a particular application when he wants to can be provided. Immediately using of a particular application when the user wants to may be expressed as 'fixing an application'. The reason is because the user may output a graphic object corresponding to an application to a region of the display unit, and in this state, when a touch input according to a pre-set scheme is applied to the graphic object, an execution screen of the application corresponding to the graphic can be output immediately.

Hereinafter, a method for configuring a screen according to a control command with respect to a graphic object will be described with reference to the accompanying drawings. FIGS. 5A, 5B, 5C, and 5D are conceptual views illustrating a method for outputting screen information in response to a touch command with respect to a graphic object in the mobile terminal according to an embodiment of the present invention.

Figure 5A:
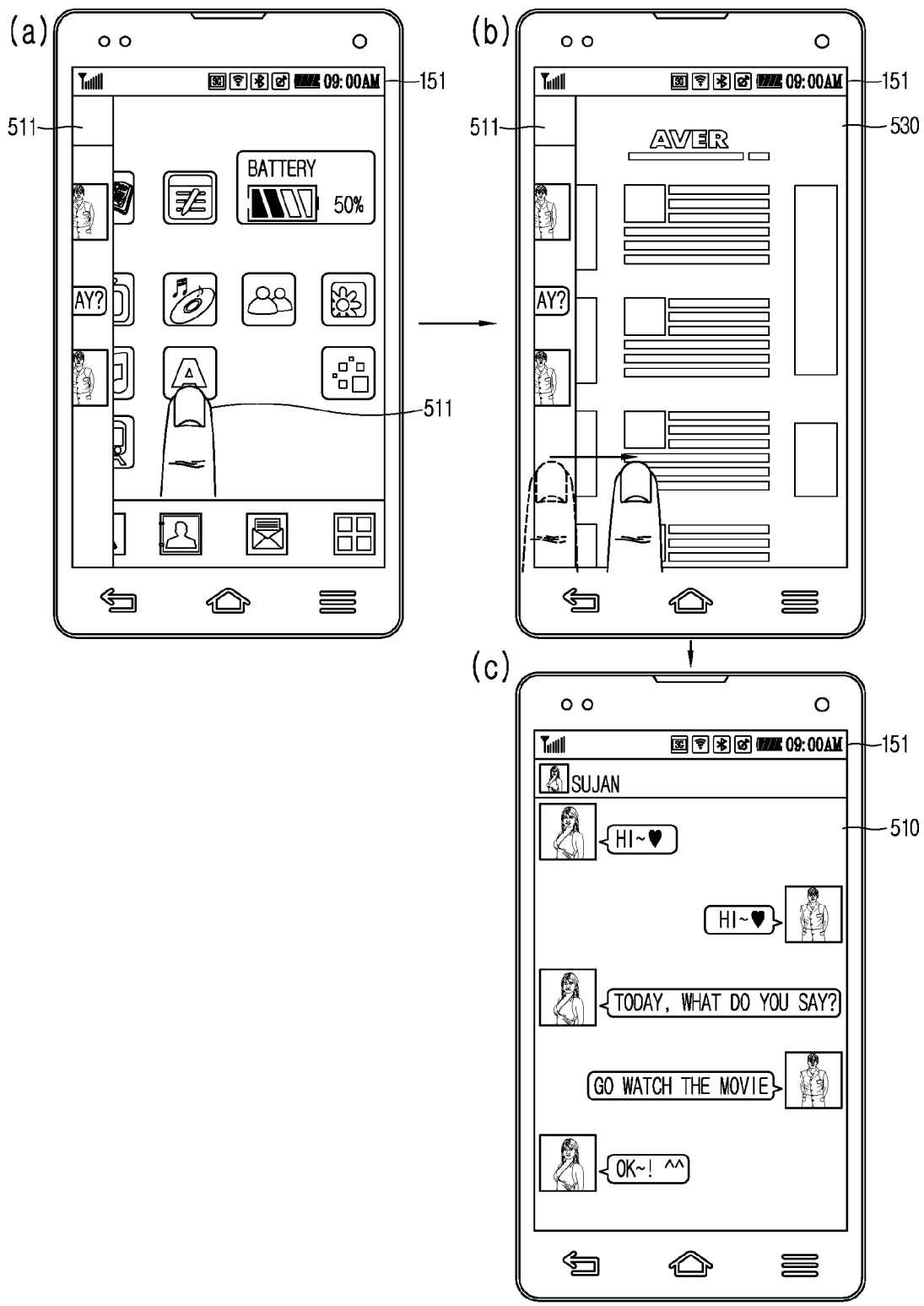

First, in the mobile terminal according to an embodiment of the present invention, as illustrated in (a) of FIG. 5A, regardless of that the graphic object 511 is displayed as the first control command is applied to the first screen information (please see FIG. 4A) to display the graphic object 511, screen information output to the display unit 151 may be changed according to a touch input applied to the second information 520 output to the display unit 151. Namely, when a touch input is applied to an icon 511 output to the second screen information 520, the controller 180 may screen information 530 corresponding to the icon 511 as illustrated in (b)

of FIG. 5A. Namely, although the graphic object 511 is output to the display unit 151, the controller 180 may output screen information corresponding to a touch input applied to the display unit 151.

Meanwhile, as illustrated, the graphic object 511 may be constantly output to the display unit 151, or otherwise, the graphic object 511 may be output to the display unit 151 periodically or according to a user manipulation of the display unit 151.

Although the second screen information is changed (520, 530) as illustrated in (a) and (b) of FIG. 5A, the controller 180 may output the first screen information corresponding to the graphic object 511 again to the display unit 151 in response to a touch input (or a second control command) applied to the graphic object 511 according to a pre-set scheme as illustrated in (c) of FIG. 5A. Thus, the user may be provided with screen information regarding an application desired to be used again, through the graphic object 511, any time, regardless of the type of the screen information output to the display unit 151.

Hereinafter, a method for configuring screen information according to a touch input applied to a graphic object will be described in detail. The controller 180 may change a display size of the graphic object 511 according to a degree of dragging applied to the graphic object 511. For example, when the graphic object 511 is a portion of the first screen information, the degree at which the first screen information is displayed may be variously changed.

Figure 5B:
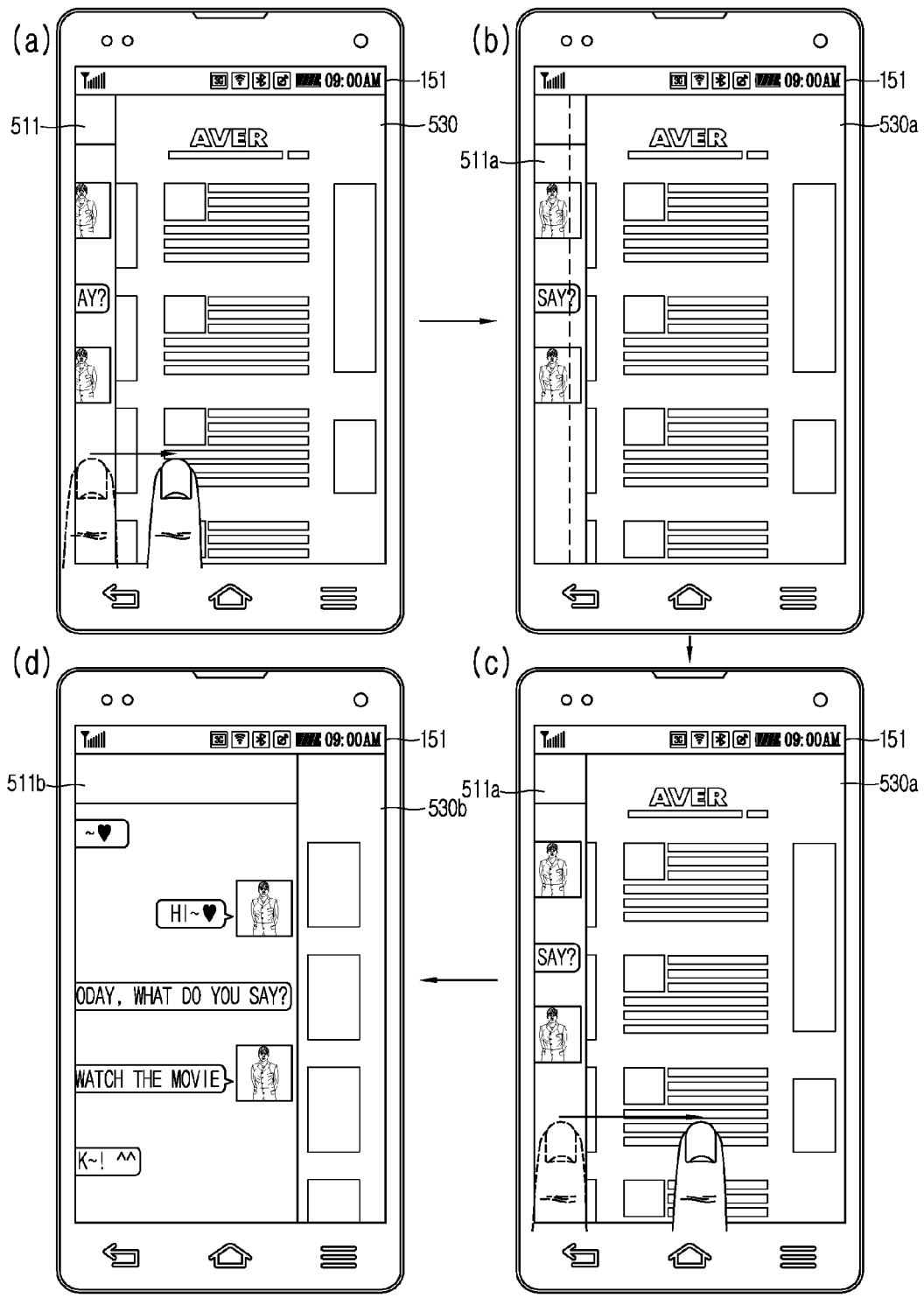

Thus, as illustrated in (a), (b), (c), and (d) of FIG. 5B, the size of a region in which the graphic object 511 is displayed is gradually changed according to a degree of dragging applied to the graphic object 511 (please see 511, 511a, and 511b). Meanwhile, the graphic object 511 may be output such that it overlaps with the second screen information 530, and as illustrated in (a), (b), (c), and (d) of FIG. 5B, as the size of the region in which the graphic object is displayed is increased, a display size of the second screen information 530 may be gradually reduced (please see 530, 530a, and 530b).

Meanwhile, when a touch input (e.g., a long touch or a double-touch) according to a pre-set scheme is applied to the first graphic object 511 (or a portion of the first screen information) as illustrated in (a) of FIG. 5C, the controller 180 may control the display unit 151 to display the first screen information 510 corresponding to the first graphic object 511 entirely as illustrated in (b) of FIG. 5C. Namely, the controller 180 may control a display size and a display ratio of the first screen information such that the first screen information 510 can be entirely output in the region in which the first graphic object 511 is displayed. Also, in this case, as illustrated in (b) of FIG. 5C, a display size and a display ratio of the second screen information 530a may be controlled such that it is output not to overlap with the first screen information 510.

Meanwhile, although not shown, when a pre-set touch input (please refer to the second control command as described above) is applied to the first screen information 510, the controller 180 may terminate displaying of the second screen information and entirely output the first screen information to the display unit 151. In this manner, the controller 180 may variously change displaying of the graphic object or the first screen information in response to touch inputs applied to the graphic object based on different schemes.

Figure 5D:
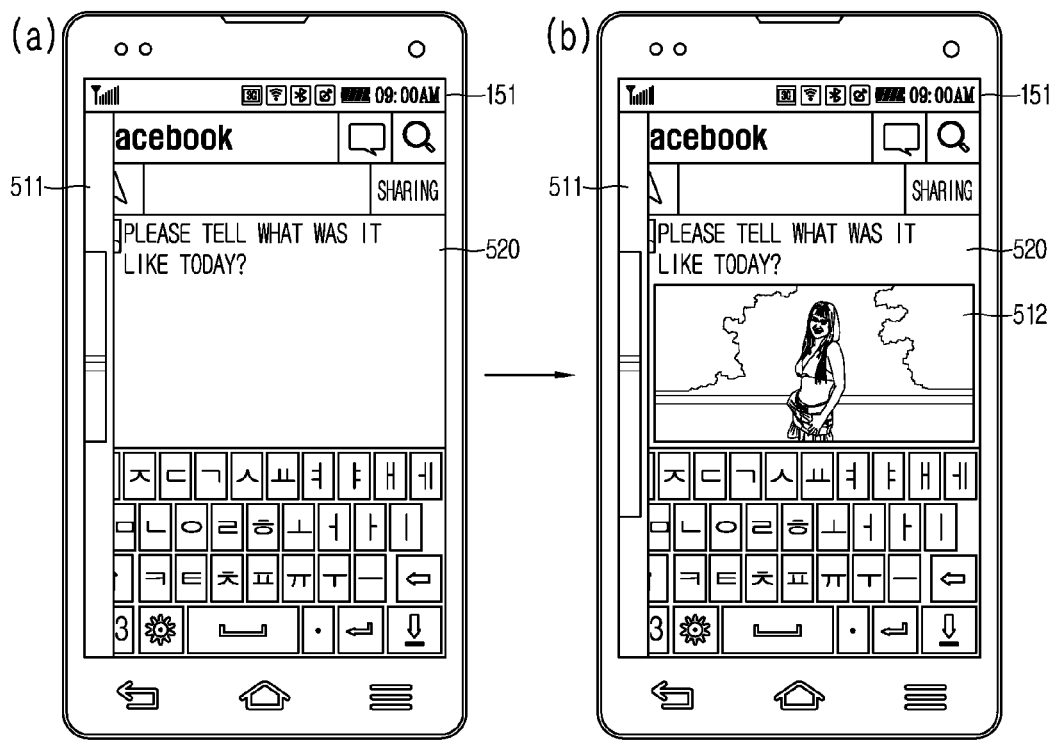

Meanwhile, as illustrated in FIG. 5D, even when the screen information corresponding to the graphic object 511 is not directly output to the display unit 151, contents 512 included in the screen information corresponding to the graphic object 511 may be used according to a touch input (e.g., a long touch input) according to a pre-set scheme applied to the graphic object 511. For example, in a case in which the graphic object 511 illustrated in (a) of FIG. 5D corresponds to a gallery function application and a certain photograph is included in the screen information regarding the gallery function application, when a touch input according to a pre-set scheme is applied to the graphic object 511, the certain photograph 512 as illustrated in (b) of FIG. 5D may be output to the display unit 151. Namely, the controller 180 may utilize contents (e.g., an image) included in the screen information regarding the application corresponding to the graphic object 511 through a touch input applied to the graphic object 511 according to a pre-set scheme.

As described above, in the mobile terminal and the control method thereof according to embodiments of the present invention, various screens may be configured by utilizing a graphic object.

Hereinafter, a method for displaying a graphic object will be described in detail with reference to the accompanying drawings. FIG. 6 is a conceptual view illustrating a method for displaying a graphic object in the mobile terminal according to an embodiment of the present invention.

As described above, a graphic object may have visual information corresponding to a portion of an execution screen of an application corresponding to a graphic object. Also, the graphic object may have various other visual information Also, a size of the graphic object may be variously modified.

For example, as illustrated in (a) of FIG. 6, a graphic object 610 may be displayed to have a color representing an application corresponding to the graphic object 610 in a region of the display unit 151. The graphic object 610 may be displayed to overlap with an execution screen of a different application or an idle screen.

Also, as illustrated in (b) of FIG. 6, a graphic object 620 may be displayed as an icon having a certain image on a status bar 621 in which status information (e.g., a reception state, a communication scheme, a wireless communication network, whether a GPS is used, time, etc.) of the mobile terminal. In this case, the graphic object 620 may be output such that it does not interfere with other screen information displayed on the display unit 151.

Also, as illustrated in (c) of FIG. 6, a graphic object 630 may be displayed in the form of an icon having a certain image such that it overlaps with an execution screen of a different application or an idle screen.

As described above, a graphic object indicating that an application is fixed may be displayed in various manners.

Figure 7A:
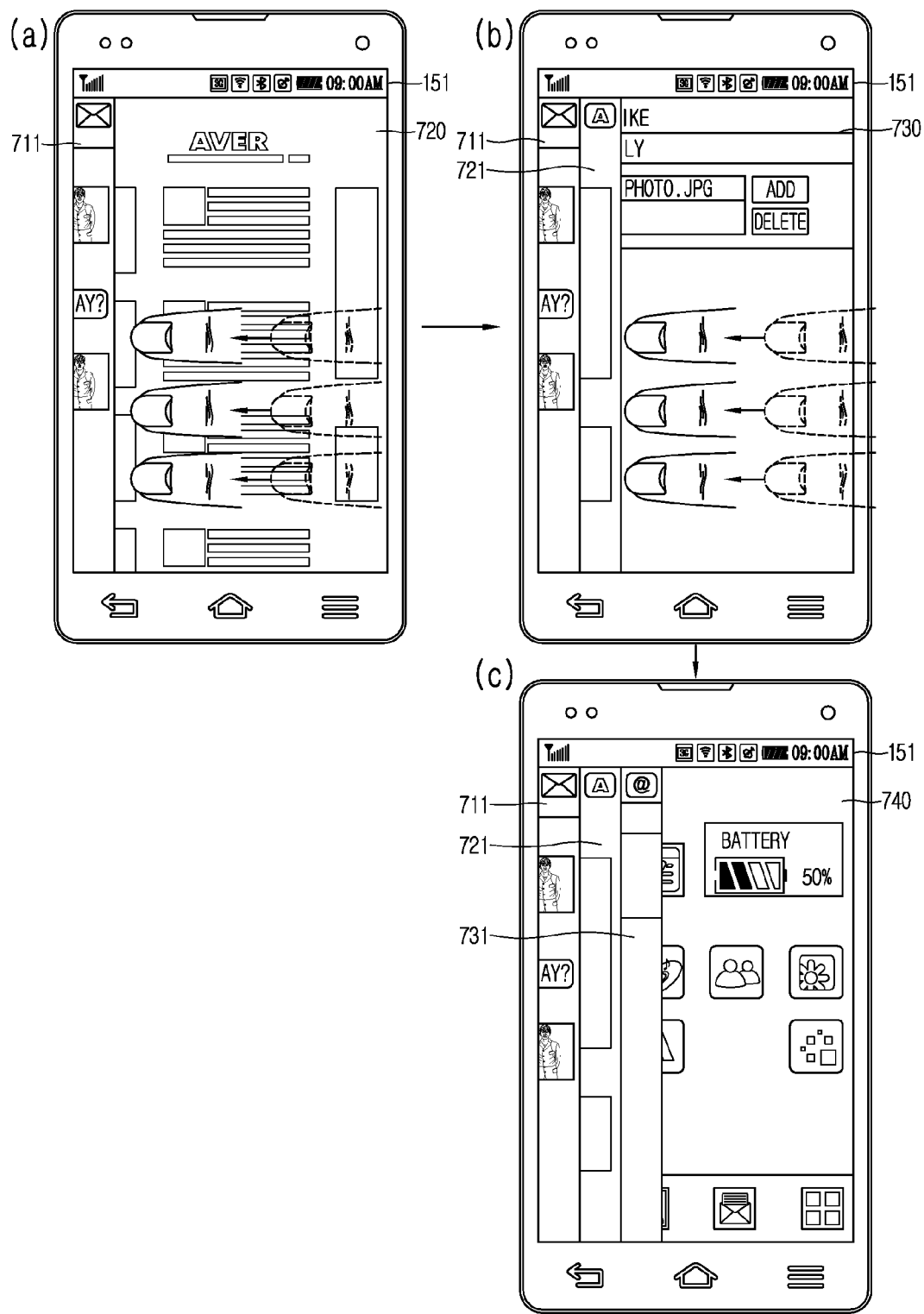
FIGS. 7A, 7B, and 7C are conceptual views illustrating a method for displaying a plurality of graphic objects in the mobile terminal according to an embodiment of the present invention.
Figure 7B:
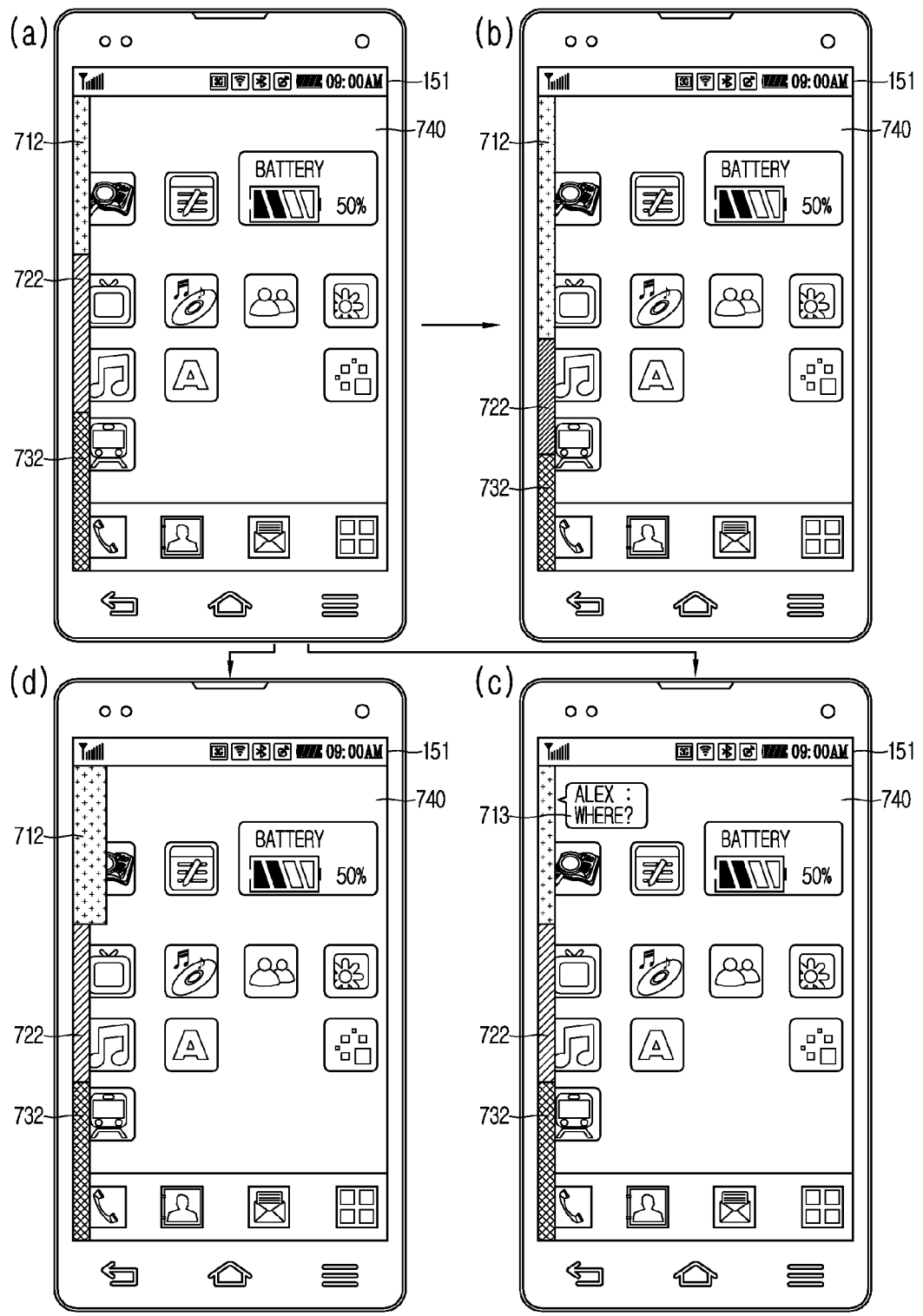
Figure 7C:
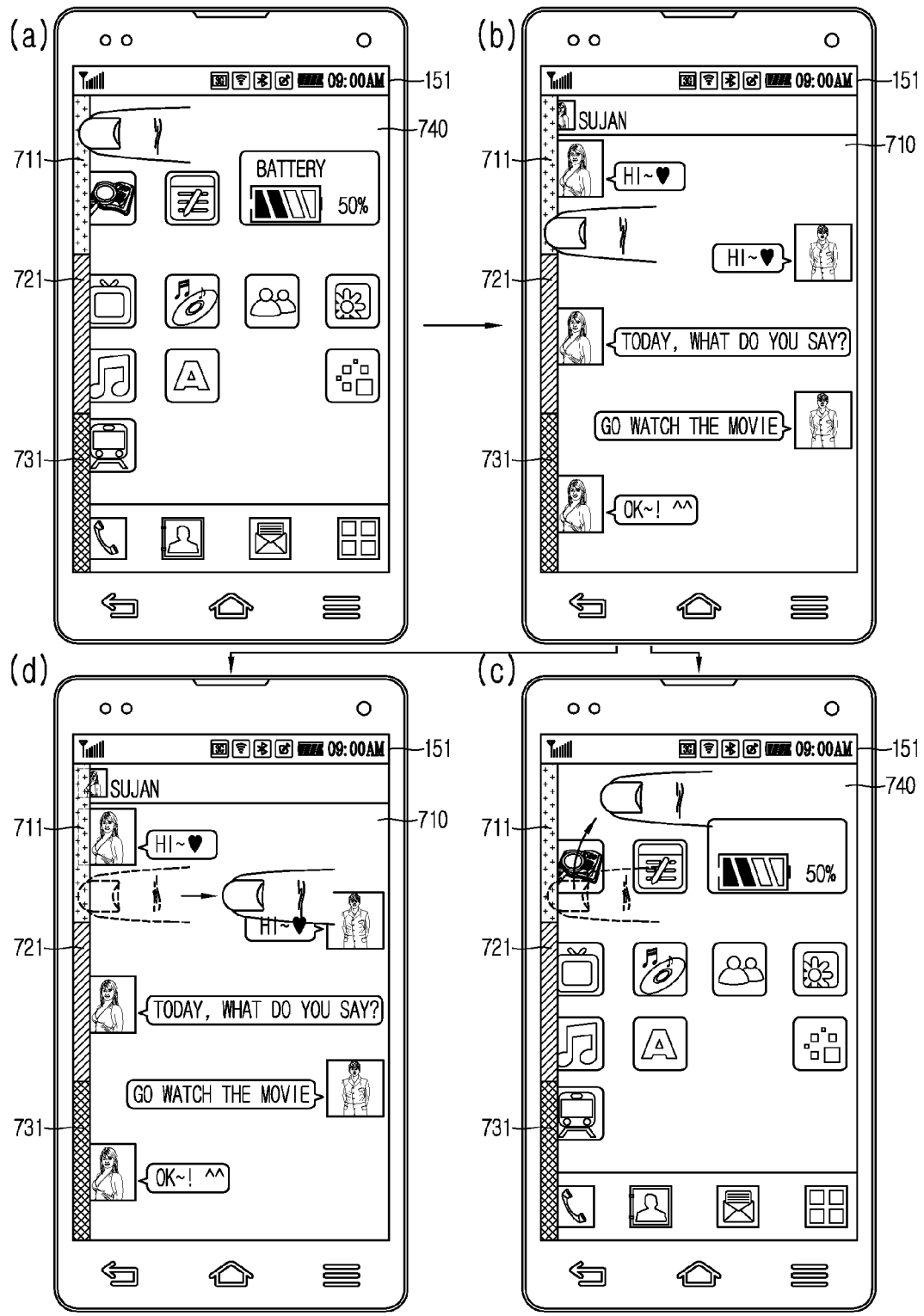

Hereinafter, a method for fixing a plurality of applications will be described in detail with reference to the accompanying drawings. FIGS. 7A, 7B, and 7C are conceptual views illustrating a method for displaying a plurality of graphic objects in the mobile terminal according to an embodiment of the present invention.

In the above, the method for fixing a single application has been described. Meanwhile, in the mobile terminal according to an embodiment of the present invention as described above, a plurality of applications, as well as a single application, may be fixed according to a user selection.

Namely, as described above with reference to (a) and (b) of FIG. 4A, in a state in which the first screen information corresponding to the first application is output, when the first control command is received, the controller 180 may switch the first screen information to the second screen information different from the first screen information in response to the first control command, and output a first graphic object 711 (please see (a) of FIG. 7A) representing the first application to at least a region of the display unit 151.

Here, the first control command may correspond to drag and touch inputs applied to three spots on the display unit.

Meanwhile, in a case in which the execution screen of the second application is output as the second screen information, the user may apply the first control command with respect to the execution screen of the second application. Thus, in a state in which the second screen information 720 is output to the display unit 151 as illustrated in (a) of FIG. 7A, when the first control command is applied, the controller 180 may output third screen information 730 to the display unit 151 and output the first graphic object 711 corresponding to the first application and a second graphic object 721 corresponding to the second application as illustrated in (b) of FIG. 7A.

Also, when an execution screen corresponding to the third application is output as the third screen information 730, the controller 180 may output fourth screen information 740 to the display unit 151 and output the first graphic object 711 corresponding to the first application, the second graphic object 721 corresponding to the second application, and a third graphic object 731 corresponding to a third application as illustrated in (c) of FIG. 7A.

In this manner, in response to the first control command for fixing a plurality of applications, the controller 180 may output a plurality of graphic objects corresponding to a plurality of applications, respectively, to the display unit 151.

The plurality of graphic objects may be sequentially displayed on the basis of a region of the display unit 151, and display order of the plurality of graphic objects may be based on a point in time at which the first control command is applied with respect to each of the plurality of applications.

Namely, the first graphic object 711 corresponding to the first application to which the first control command is first applied is disposed to be closest to a region of the display unit, the second graphic object 721 corresponding to the second application to which the first control command is applied is disposed next to the first graphic object 711, and the third graphic object 731 corresponding to the third application may be disposed finally.

In another example of the method for displaying a plurality of graphic objects, as illustrated in (a) of FIG. 7B, first, second, and third graphic objects 712, 722, and 732 corresponding to first, second, and third applications may be disposed in a line in a region of the display unit 151.

Meanwhile, when an event occurs with respect to at least one of applications corresponding to the plurality of graphic objects, respectively, the controller 180 may output the generated event information to a graphic object or a region adjacent to the graphic object.

Namely, the controller 180 may visually highlight (magnification and reduction, flickering, changing a size, changing transparency, displaying event content, and the like) at least one graphic object corresponding to the application for which the event has occurred.

Here, the event may occur when notification information, or the like, is received from the outside, when a performed operation is completed, and the like.

For example, when an event occurs in the first application, the controller 180 may magnify a size of a first graphic object 712 corresponding to the first application in one direction as illustrated in (b) of FIG. 7B. In this case, sizes of the second and third graphic objects 722 and 723 may be relatively reduced.

In another example, when an event occurs in the first application, the controller 180 may output a pop-up window 713 to a region adjacent to the first graphic object 712 corresponding to the first application as illustrated in (c) of FIG. 7B. In this case, the pop-up window 713 may include at least a portion of information corresponding to the generated event.

Meanwhile, in the mobile terminal according to an embodiment of the present invention, information regarding an event-generated application may be provided according to various methods by utilizing a graphic object.

Meanwhile, in the mobile terminal according to an embodiment of the present invention, in response to a touch input applied to a graphic object according to a pre-set scheme, preview information corresponding to an execution screen of an application corresponding to the graphic object may be output. The embodiment in which such preview information is provided may be applied in the same manner also when a single graphic object is output.

In the above description, in response to the second control command with respect to a graphic object, e.g., in response to a drag and touch input, the controller may output screen information (or an execution screen) of an application corresponding to the graphic object.

Besides, in response to a control command different from the second control command, namely, in response to a touch input according to a scheme different from that of the drag and touch input, the controller 180 may output preview information of screen information (or an execution screen) of an application corresponding to a graphic object.

For example, as illustrated in (a) and (b) of FIG. 7C, when a touch is applied to a spot of the first graphic object 711, screen information 710 regarding an application corresponding to the first graphic object 711 may be output. Also, as illustrated in (c) of FIG. 7C, when the touch applied to the first graphic object 711 is terminated, the screen information may be returned to a state before the screen information 710 was output. Namely, while the touch with respect to the graphic object is maintained, the controller 180 may output the preview information, and when the touch is terminated, the controller 180 may terminate outputting of the preview information.

Also, as illustrated in (b) and (d) of FIG. 7C, in a state in which the preview information is output, when a second control command (e.g., a drag and touch input) is applied to the first graphic object 711, the controller 180 may continuously output screen information regarding the application corresponding to the first graphic object 711 to the display unit 151.

In this case, the first graphic object 711 may not be output to the display unit 151 any longer, and when the first graphic object 711 is not displayed any longer, display positions of the second and third graphics 7221 and 731 may be re-aligned.

Hereinafter, a method for controlling a plurality of screen information corresponding to a plurality of applications when the plurality of applications are fixed as described above will be described in detail with reference to the accompanying drawings. FIGS. 8A, 8B, 8C, 9A, 9B, 9C, and 9D are conceptual views illustrating a method for displaying screen information corresponding to a plurality of graphic objects, respectively, in the mobile terminal according to an embodiment of the present invention.

Figure 8A:
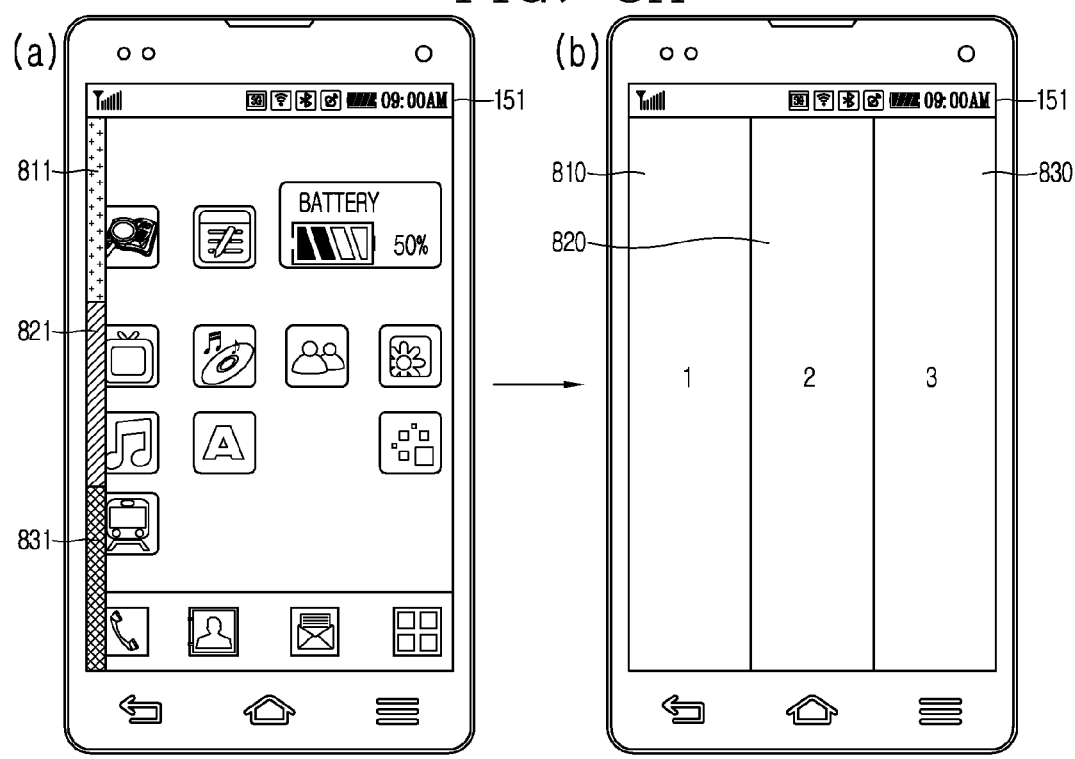

In the mobile terminal according to an embodiment of the present invention, as illustrated in (a) in FIG. 8, when a plurality of applications are fixed, pieces of screen information 810, 820, and 830 regarding the plurality of applications may be displayed together as illustrated in (b) of FIG. 8A.

In the drawing, the pieces of screen information regarding the plurality of applications is expressed as '1', '2', and '3' corresponding to the first, second, and third applications, respectively, for the description purpose.

Meanwhile, the plurality of pieces of screen information 810, 820, and 830 may be output according to a touch input applied to the plurality of graphic objects 811, 821, and 831 corresponding to the plurality of applications, respectively, or a region adjacent to the regions in which the plurality of graphic objects 811, 821, and 831 are displayed. The scheme of the touch input may be variously modified.

Namely, as illustrated in (b) of FIG. 8A, the plurality of pieces of screen information 810, 820, and 830 may be output together to provide information regarding what the fixed applications are to the user.

Namely, the user may output only any one of the plurality of pieces of screen information 810, 820, and 830 or simultaneously output the plurality of pieces of screen information 810, 820, and 830 as necessary.

Also, in the state in which the plurality of pieces of screen information 810, 820, and 830 are output to the display unit 151, a graphic object may not be output any longer.

Meanwhile, the controller 180 may change order in which the plurality of pieces of screen information 810, 820, and 830 are disposed according to a user selection. Namely, the controller 180 may change order in which pieces of screen information are disposed according to a touch input according to a pre-set scheme applied to the plurality of pieces of screen information 810, 820, and 830.

Figure 8B:
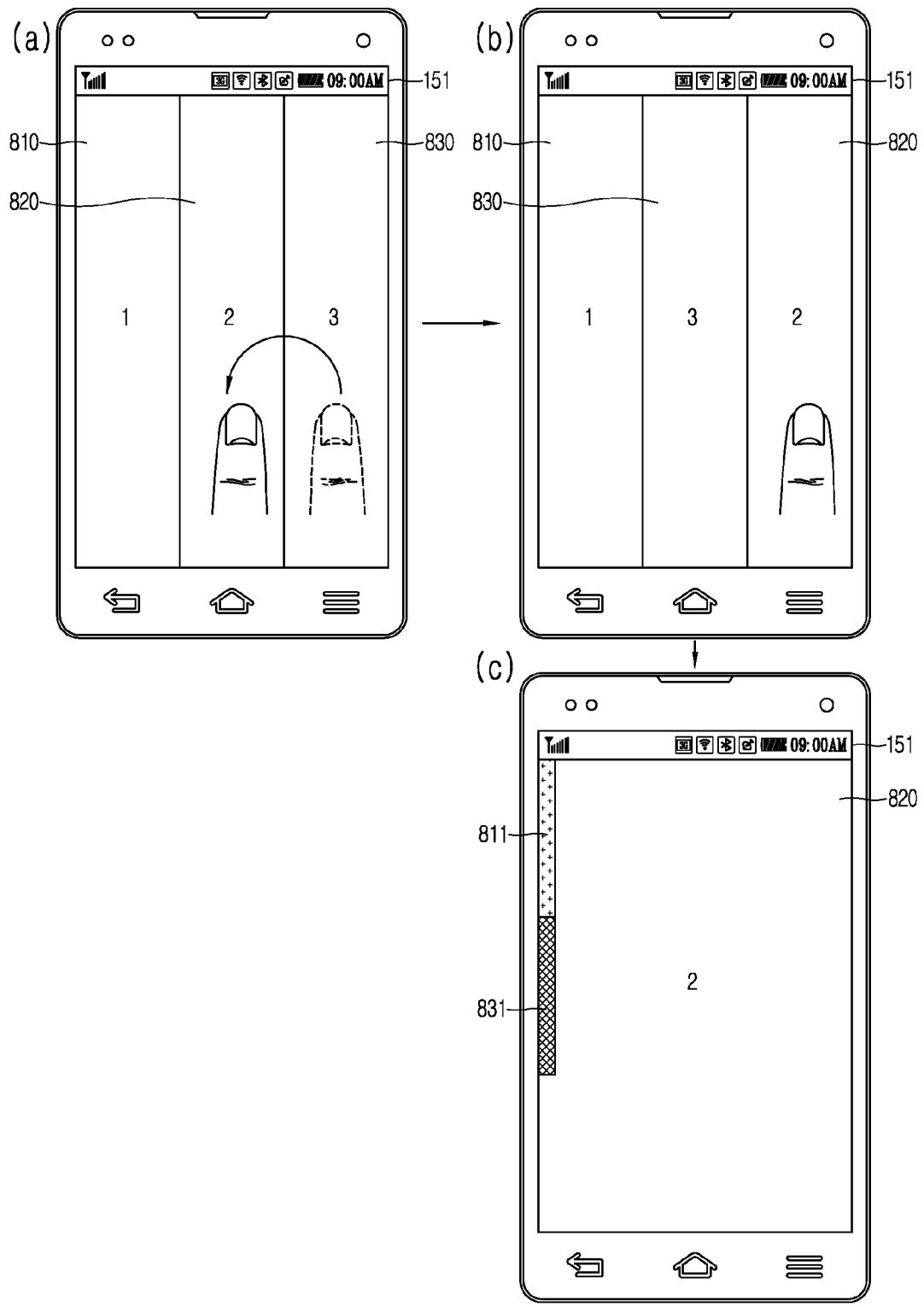

For example, after a long touch input is applied to the third screen information 830, when the third screen information 830 is dragged to the second screen information 820 as illustrated in (a) of FIG. 8B, the controller 180 may change a layout order of the second screen information 820 and the third screen information 830 as illustrated in (b) of FIG. 8B. Meanwhile, when a short touch input, rather than a long touch input, is applied to any one of pieces of screen information as illustrated in (b) of FIG. 8B, the controller 180 may output the screen information to which the short touch input was applied, to the display unit 151 entirely, as illustrated in (c) of FIG. 8B. In this case, graphic objects 811 and 831 corresponding to the first and third screen information may be output again to the display unit 151.

Also, as illustrated in (a) of FIG. 8C, in a state in which the plurality of pieces of screen information 810, 820, and 830 are output to the display unit 151, when a touch input according to a pre-set scheme is applied to any one of the pieces of screen information, the controller 180 may terminate outputting of any one screen information and may not fix a corresponding application any longer in response.

For example, when a drag or flicking touch input is applied to the second screen information 820 in one direction as illustrated in (a) of FIG. 8C, the controller 180 may output only the first and third screen information 810 and 830, without outputting the second screen information 820, as illustrated in (b) of FIG. 8C. Also, when a short touch input, rather than a drag or flicking touch input, is applied to any one of screen information as illustrated in (b) of FIG. 8C, the short touch-applied screen information may be output to the display unit 151 entirely as illustrated in (c) of FIG. 8C. In this case, since the fixing of the application corresponding to the second screen information has been released, the controller 180 may output only the graphic object 831 corresponding to the third screen information.

As described above, in the mobile terminal according to an embodiment of the present invention, the screen information may be variously changed and configured in response to touch inputs according to various schemes with respect to screen information corresponding to a fixed application.

Meanwhile, in the mobile terminal according to an embodiment of the present invention, as described above, information regarding an application may be output according to various methods, in addition to the method of outputting screen information to the display unit 151 entirely in response to a touch input applied to a graphic object.

Figure 9A:
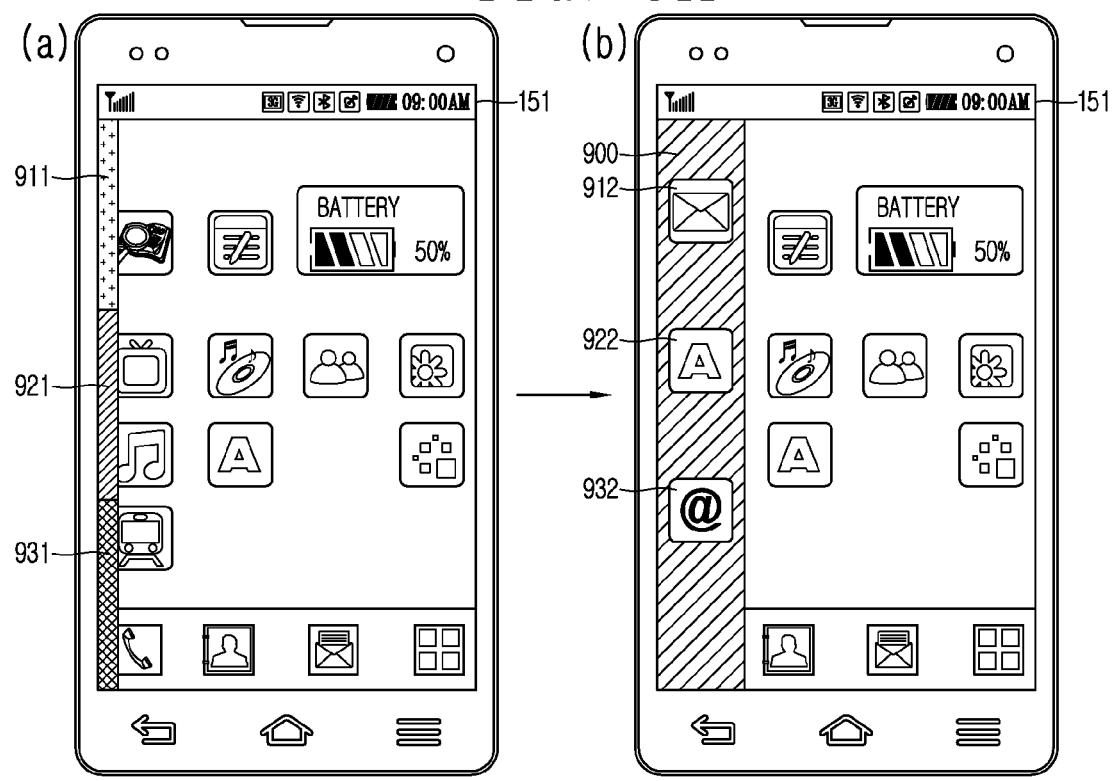

For example, when a touch input is applied to a plurality of graphic objects 911, 921, and 931 corresponding to a plurality of applications, or to a region adjacent to the region in which the plurality of graphic objects 911, 921, and 931 are displayed as illustrated in (a) of FIG. 9A, the controller 180 may output icons 912, 922, and 932 of applications corresponding to the plurality of graphic objects to a region 900 of the display unit 151 as illustrated in (b) of FIG. 9A in response.

Figure 9B:
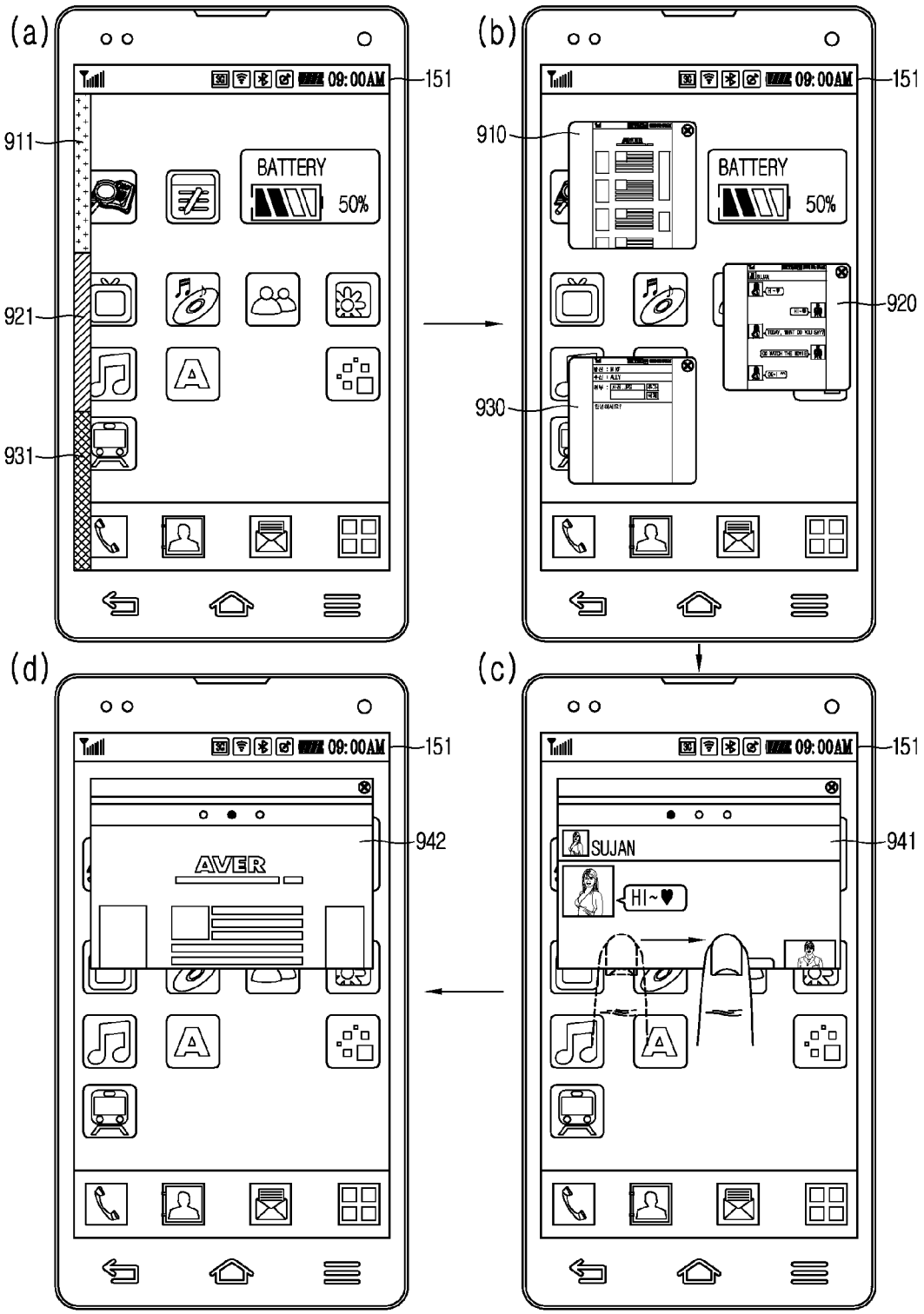

Also, in another example, when a touch input is applied to the plurality of graphic objects 911, 921, and 931 corresponding to a plurality of applications, respectively, or to a region adjacent to the region in which the plurality of graphic objects 911, 921, and 931 are displayed as illustrated in (a) of FIG. 9B, pieces of screen information 910, 920, and 930 corresponding to the plurality of graphic objects 911, 921, and 931 may overlap with screen information output to the display unit, respectively, in response. Namely, the pieces of screen information 910, 920, and 930 corresponding to the plurality of graphic objects 911, 921, and 931 may float.

Also, according to a control command applied from the user, the floated pieces of screen information 910, 920, and 930 may be joined to a single floating window 941 (or a pop-up window) as illustrated in (c) of FIG. 9B. Also, as illustrated in (c) and (d) of FIG. 9B, when a touch input is applied to the floating window 941, the controller 180 may change (from 941 to 942) screen information output to the floating window in response.

Also, as illustrated in (a) and (b) of FIG. 9C, the floating window may be divided into at least two floating windows 942 and 943 according to a user's touch input with respect to the floating window.

In this case, screen information, which was output to the floating window 941 (please see (a) of FIG. 9C) before the dividing, is output to the divided floating window 943, and screen information corresponding to a graphic object different from the graphic object corresponding to the screen information output to the divided floating window 943 among the plurality of graphic objects may be output to the floating window 942 (please see (b) in FIG. 9C).

Meanwhile, a size and position of the floating window may be changed or deleted according to a user selection. When a floating window is deleted, a graphic object may be output again to the display unit 151.

Figure 9D:
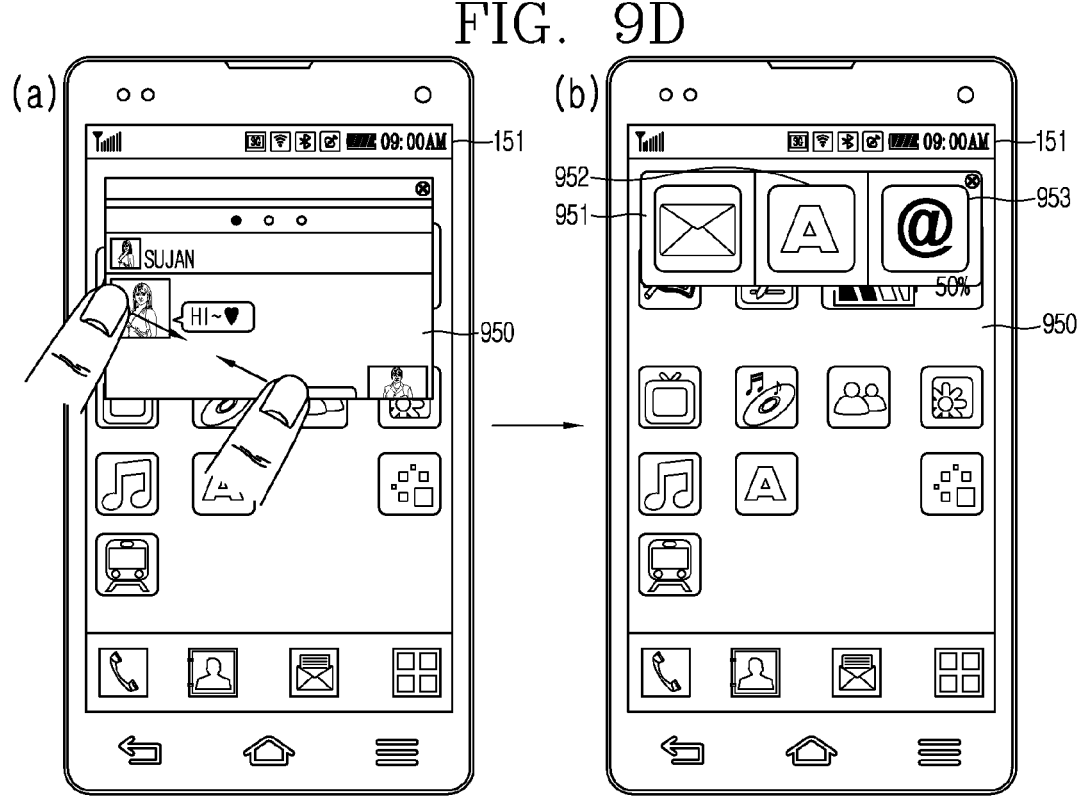

Also, as illustrated in (a) and (b) of FIG. 9D, when a size of the floating window is minimized, the controller 180 may output icons 951, 952, and 953 of applications corresponding to the plurality of graphic objects, respectively, instead of the screen information, to the floating window 950.

Figure 10A:
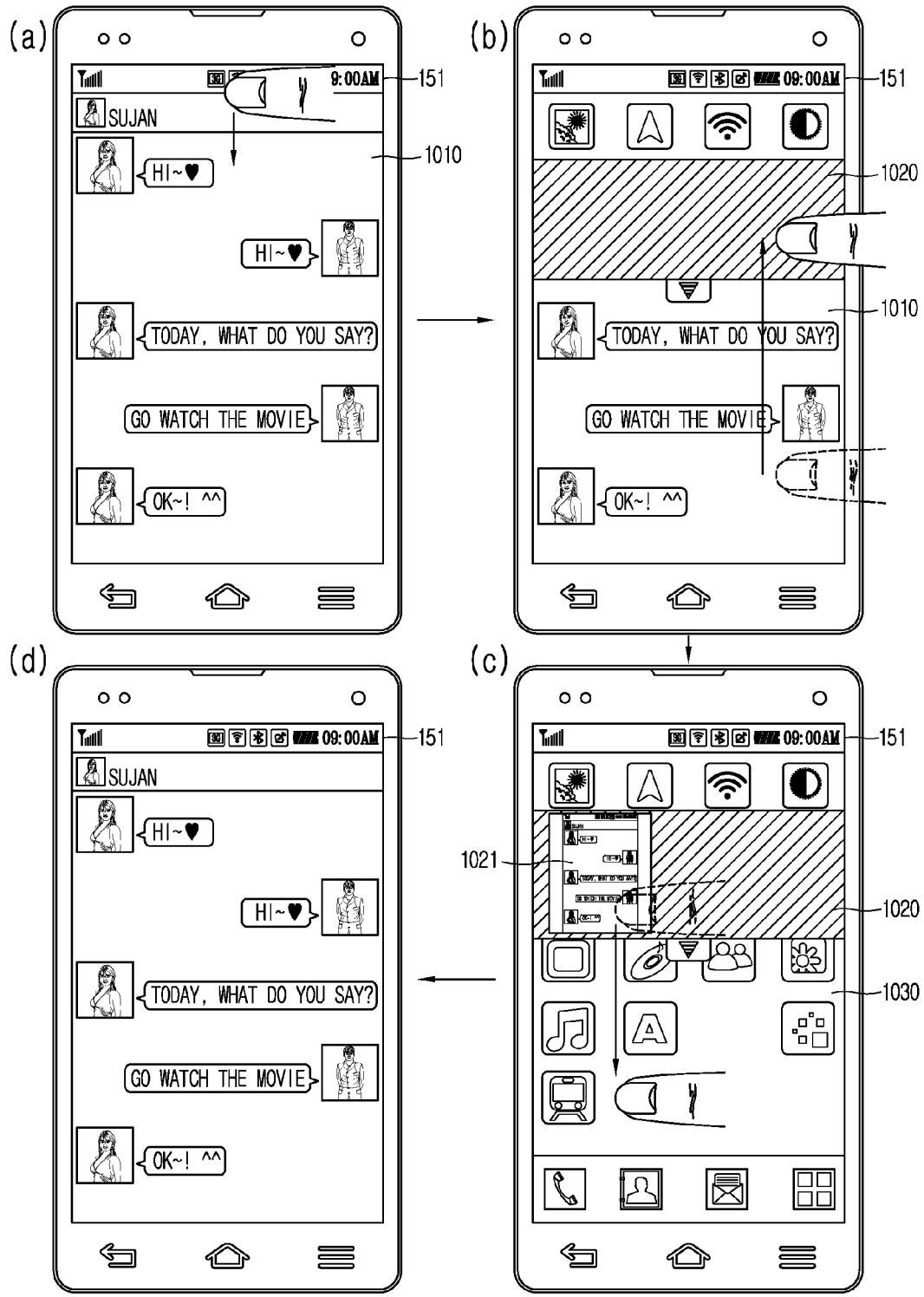
FIGS. 10A and 10B are conceptual views illustrating a control command for controlling screen information output to a display unit in the mobile terminal according to an embodiment of the present invention.
Figure 10B:
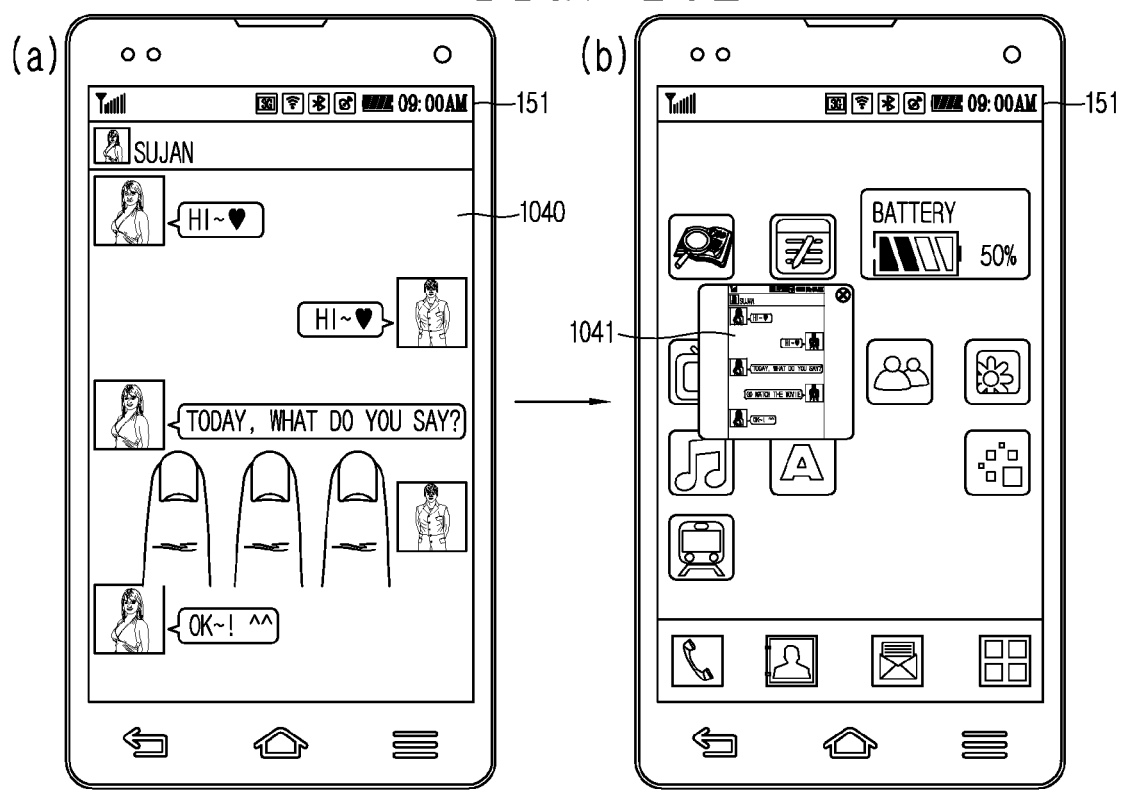

Hereinafter, a method for fixing an application output to the display unit will be described in detail with reference to the accompanying drawings. FIGS. 10A and 10B are conceptual views illustrating a control command for controlling screen information output to a display unit in the mobile terminal according to an embodiment of the present invention.

In the above, the drag and touch input applied to at least three spots of the display unit 151 has been described according to an embodiment of the first control command for fixing an application corresponding to screen information output to the display unit. Meanwhile, in the mobile terminal according to an embodiment of the present invention, besides the drag and touch input applied to at least three spots, a first control command for fixing an application can be received according to various methods.

For example, as illustrated in (a) and (b) of FIG. 10A, after a notification window 1020 output in response to a touch input applied to a region of the display unit 151 is output, a drag and touch input starting from a region to which screen information 1010 is output is continued up to the notification window 1020, the controller 180 may fix an application corresponding to the screen information 1010 as illustrated in (c) of FIG. 10A. In this case, a graphic object 1021 corresponding to the application may be included in the notification window 1020. Also, as illustrated in (c) and (d) of FIG. 10A, when a touch input, e.g., a drag and touch input, is applied to the graphic object 1021 included in the notification window 1020, screen information corresponding to the graphic object 1021 may be output to the display unit 151.

In another example, when a long touch input is applied to three spots of the display unit 151 as illustrated in (a) of FIG. 10B, the controller 180 may output a floating window 1041 including thumbnails corresponding to the screen information 1040 as illustrated in (b) of FIG. 10B. Visual information regarding a size, a position, and the like, of the floating window 1041 may be variously changed according to a user selection. Also, when the floating window 1041 is dragged to an edge region of the display unit 151, the controller may indicate that the application is fixed by using a graphic object, instead of the floating window, as described above with reference to FIG. 4A.

Figure 11B:
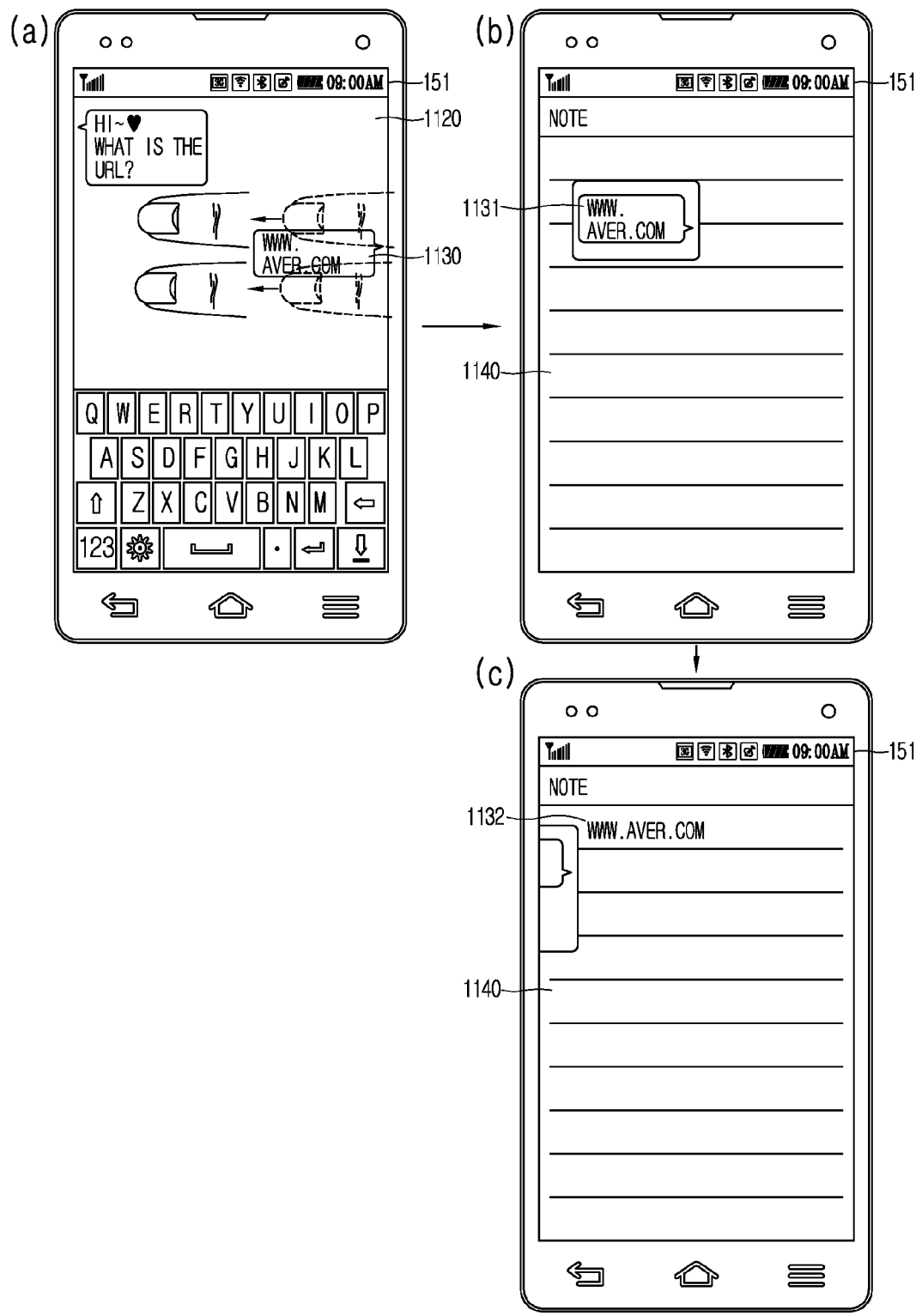

Hereinafter, a method for utilizing screen information output to the display unit will be described in detail with reference to the accompanying drawings. FIGS. 11A and 11B are conceptual views illustrating a method for utilizing screen information output to the display unit in the mobile terminal according to an embodiment of the present invention.

In the above embodiments, the method for fixing an application has been described. Namely, in a state in which screen information of an application is output, when a first control command is applied, the controller 180 outputs a graphic object to allow for quickly accessing the application. However, in the mobile terminal according to an embodiment of the present invention, when a capture command with respect to currently output screen information is applied as illustrated in (a) of FIG. 11A, the controller 180 may output a graphic object 1111 to a region of the display unit 151 as illustrated in (b) and (c) of FIG. 11A, so that an image corresponding to the captured screen information can be immediately accessed.

Meanwhile, according to an attributed of an application in which such a captured image is utilized, the controller 180 may output the captured image as an image format or as a text format. For example, the application in which the captured image is utilized is a note function application and text is included in the captured image, the controller 180 may output the text included in the captured image to an execution screen of the note function application. Also, the controller 180 may allow the user to determine whether to maintain the captured image as it is or whether to extract the text included in the captured I mage.

Also, the controller 180 may perform a capture or copy function only on a portion selected by the user from the screen information output to the display unit 151. For example, when a touch input according to a pre-set scheme is applied only to a region 1130 of the screen information 1120 output to (a) of FIG. 11B, although not shown, the controller 180 may output a graphic object corresponding to the region 1130. Also, in response to a touch input applied to the graphic object, the controller 180 may output an image 1131 corresponding to the region as illustrated in (b) of FIG. 11B or may output text 1132 included in the region as illustrated in (c) of FIG. 11B.

As described above, in the case of the mobile terminal according to embodiments of the present invention, screen information output to the display unit can be utilized according to various methods by utilizing a touch input applied to the display unit.

Also, in the case of the mobile terminal according to embodiments of the present invention, a graphic object representing a frequently used application can be output to the display unit, and the display unit can be controlled in response to a touch input applied to the graphic object, such that the user can immediately use the frequently used application. Thus, a cumbersome process for entering the application frequently used by the user can be omitted.

In the embodiments of the present invention, the foregoing method may be implemented as codes that can be read by a processor in a program-recorded medium. The processor-readable medium may include any types of recording devices in which data that can be read by a computer system is stored. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet).

The mobile terminal according to the embodiments of the present disclosure is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:
1. A mobile terminal comprising:
a touch screen configured to output first screen information corresponding to a first application; and
a controller configured to:
cause the touch screen to display a first graphic object representing the first application and second screen information different from the first screen information in response to a first touch input applied to the touch screen in a state where the first screen information is displayed on the touch screen,
wherein the first screen information is disappeared and the second information is displayed in response to the first touch input, and the first graphic object representing the first application is overlapped with the second information, wherein the second screen information is screen information corresponding to a second application different from the first application,
cause the touch screen to display the first screen information corresponding to the first application again in response to a second touch input applied to the first graphic object representing the first application, wherein the second screen information is changed into the first screen information,
output a second graphic object representing the second application such that it is in the proximity of the first graphic object, wherein the first and second graphic objects are sequentially displayed on the basis of a region of the touch screen, and the display order of the first and second graphic objects is based on a point in time at which the first touch input with respect to the first and second applications is received.

2. The mobile terminal of claim 1, wherein the first touch input corresponds to a drag input, starting from at least two touch spots of the touch screen, applied in a pre-set one direction in a state in which the first screen information is output to the touch screen, and the second touch input corresponds to a touch input according to a pre-set scheme applied to the first graphic object.

3. The mobile terminal of claim 2, wherein the second screen information is screen information regarding the second application executed most recently before the first application is executed, or is an idle screen.

4. The mobile terminal of claim 2, wherein whether the second screen information is screen information regarding the second application or an idle screen differs according to a direction in which the drag and touch input corresponding to the first touch input is applied.

5. The mobile terminal of claim 1, wherein when a touch input corresponding to the second touch input is applied to the region in which the first and second graphic objects are displayed, at least portions of the first and second screen information corresponding to the first and second applications are displayed together on the touch screen.

6. The mobile terminal of claim 5, wherein in the case in which the at least portions of the first and second screen information are displayed together, the first and second graphic objects disappear from the touch screen.

7. The mobile terminal of claim 6, wherein when a drag and touch input is applied to any one of the first and second screen information, the controller outputs the any one screen information to which the drag and touch input has been applied, to the touch screen entirely, and outputs a graphic object corresponding to the other screen information again to a region of the touch screen.

8. The mobile terminal of claim 5, wherein order in which the first and second screen information are displayed on the basis of a region of the touch screen corresponds to order in which the first and second graphic objects are displayed, and in response to a touch input according to a pre-set scheme applied to any one of the first and second screen information, the controller changes order in which the first and second screen information are displayed.

9. The mobile terminal of claim 8, wherein the display order of the first and second graphic objects is changed dependently according to a change in the display order of the first and second screen information.

10. The mobile terminal of claim 5, wherein when a drag and touch input is applied to any one of the first and second screen information in a pre-set one direction, the controller controls the touch screen not to output any one screen information any longer.

11. The mobile terminal of claim 1, wherein when an event occurs with respect to at least one of the first and second applications, the controller visually highlights at least one graphic object corresponding to the event-generated application among the first and second graphic objects.

12. The mobile terminal of claim 1, wherein the first graphic object has visual information corresponding to at least a portion of the first screen information.

13. The mobile terminal of claim 12, wherein the controller gradually outputs the first screen information to the touch screen on the basis of a degree at which the first graphic object is dragged, and the second screen information output to the touch screen overlaps with the first screen information.

14. A control method of a mobile terminal, the method comprising:

outputting first screen information corresponding to a first application to a touch screen;

causing the touch screen to display a first graphic object representing the first application and second screen information different from the first screen information in response to a first touch input applied to the touch screen in a state where the first screen information is displayed on the touch screen, wherein the first screen information is disappeared and the second information is displayed in response to the first touch input, and the first graphic object representing the first application is overlapped with the second information, and causing the touch screen to display the first screen information corresponding to the first application again in response to a second touch input applied to the first graphic object representing the first application, wherein the second screen information is changed into the first screen information, wherein a position at which the first screen information is displayed is changed on the basis of a touch input applied to the region in which the first screen information is displayed.

15. The method of claim 14, wherein an attribute of the first screen information output to the touch screen in response to the second touch input differs according to a direction in which the first touch input is applied.

16. The method of claim 15, wherein the attribute of the first screen information is an execution screen of the first application or a captured image of the first screen information which was output to the touch screen when the first touch input was applied.

17. The method of claim 14, wherein when the second touch input is applied, the second screen information on the touch screen is switched to the first screen information, and when a third touch input different from the second touch input is applied to the touch screen, the first screen information is output such that it overlaps with the second screen information.

* * * * *